United States Patent
Knutson

(10) Patent No.: US 10,000,244 B2
(45) Date of Patent: Jun. 19, 2018

(54) TILTABLE CABIN

(71) Applicant: Wacker Neuson Production Americas L.L.C., Menomonee Falls, WI (US)

(72) Inventor: Donovan Knutson, Slinger, WI (US)

(73) Assignee: Wacker Neuson Production Americas, L.L.C., Menomonee Falls, WI (US)

(*) Notice: Subject to any disclaimer, the term of this patent is extended or adjusted under 35 U.S.C. 154(b) by 158 days.

(21) Appl. No.: 15/046,120

(22) Filed: Feb. 17, 2016

(65) Prior Publication Data
US 2017/0233015 A1 Aug. 17, 2017

(51) Int. Cl.
*B62D 33/07* (2006.01)
*B62D 33/06* (2006.01)
*B62D 33/073* (2006.01)

(52) U.S. Cl.
CPC ......... *B62D 33/07* (2013.01); *B62D 33/0617* (2013.01); *B62D 33/073* (2013.01)

(58) Field of Classification Search
CPC ... B62D 33/07; B62D 33/073; B62D 33/0617
USPC ........................................ 296/190.05, 190.06
See application file for complete search history.

(56) References Cited

U.S. PATENT DOCUMENTS

| | | | | |
|---|---|---|---|---|
| 4,276,953 A * | 7/1981 | Penzotti | ................. | B60K 20/04 180/328 |
| 5,553,992 A * | 9/1996 | Ashcroft | ............... | E02F 9/2004 414/685 |
| 5,918,694 A * | 7/1999 | Miller | ................... | E02F 3/3405 180/328 |
| 5,941,330 A * | 8/1999 | Miller | ................... | E02F 3/3405 180/328 |
| 6,854,546 B2 * | 2/2005 | Beckstrom | ........... | B62D 33/067 180/89.13 |
| 6,910,731 B2 * | 6/2005 | Albright | .............. | B62D 33/067 180/89.16 |
| 2008/0314854 A1 * | 12/2008 | Kamiya | .................. | B66C 13/56 212/289 |
| 2011/0265596 A1 * | 11/2011 | Ferron | ................. | B62D 33/073 74/473.15 |

OTHER PUBLICATIONS

Website screenshot; CAT http://www.constructionequipment.com/262d; May 1, 2014.
Website screenshot; CHN https://www.youtube.com/watch?v=VW1U9Y_M894; Nov. 6, 2015.
Website screenshot; Bobcat http://www.skidsteerforum.com/DesktopDefault.aspx?tabid=54&frmView=ShowPost&PostID=53814; Apr. 2012.
Photographs; Wacker Neuson bobcat skid steer loader; prior art for the purposes of prosecution.

* cited by examiner

*Primary Examiner* — Jason S Morrow
*Assistant Examiner* — E Turner Hicks
(74) *Attorney, Agent, or Firm* — Shane Delsman; Godfrey & Kahn, S.C.

(57) ABSTRACT

A vehicle with a manual controlled hydrostatic pump and a pod that can be rotated between an open position and closed position without disconnecting operator controls in the pod from the manual controlled hydrostatic pump. The pod may also be physically isolated form the vehicle frame.

19 Claims, 23 Drawing Sheets

TILTABLE CABIN

FIELD OF THE INVENTION

This invention relates generally to industrial vehicles with operator cabins.

BACKGROUND

There are industrial vehicles which utilize arms to perform various tasks. For example, a skid steer loader or compact track loader utilizes an arm on each side of an enclosure in which a user sits, or cabin or cab, to raise and lower a work implement, e.g. a bucket. By way of another example, an excavator, telehandler and mobile crane utilize a single arm on one side of a cab to raise and lower a work implement. Other industries also use vehicles with one or more lift arms and a cab such as delimbers, feller bunchers, and harvesters.

Due to the compact nature of many such industrial vehicles, components for operating the vehicle are located behind the cab and under the cab. For example, it is common to locate the hydrostatic pump that is used to move the work implement and/or the drive system under or beneath the floor of the cab. In order to access such components, portions of operator station, which can include the cab, operator controls, roll over protection structure or ROPS, etc., must be moved. An operator station that can be assembled and/or removed from the machine frame largely intact is sometimes referred to as a pod style cabin, pod style operator station or pod.

Typically, industrial vehicles use one of two different types of hydrostatic pumps, an electronic and/or hydraulic pilot controlled pump or a manual controlled pump.

Industrial vehicles that utilize an electronic and/or hydraulic pilot controlled pump can use a single pod that can be rotated forward to allow access to such components. Such vehicles can use a single rotatable pod because the operator controls in the pod can be disconnected from the electronic and/or hydraulic pilot controlled pump, at the exterior of the pod. However, an electronic and/or hydraulic pilot controlled pump is not as advantageous as a manual controlled pump because they tend to be less reliable, less cost effective and less common, which can make replacement parts more costly and finding such parts more difficult.

Industrial vehicles that utilize a manual controlled pump cannot rotate an entire pod because the operator controls in the pod are directly connected through linkages to the manual controlled pump. Having to disconnect the operator controls from the linkages, such as by removing bolts, can be time and labor intensive and can result in misalignment of the controls when they are reconnected with the linkages requiring further refinement and modifications. Therefore, current industrial vehicles that utilize a manual controlled pump have divided the pod into two pieces. The top piece typically includes the ROPS, windows and doors and can be rotated away forwardly or rearwardly. The bottom piece typically includes the footwells, foot pedals, manual control levers, and the seat, but is not rotatable. The bottom panel may itself be broken down into further panels. In order to access components below the bottom half of the pod, the bottom half of the pod or panels thereof must be removed, for example by unbolting it from the frame of the machine. Such disassembly can be time and labor intensive.

Two piece pods are less advantageous than single pods. For example, two piece pods can be less comfortable to the operator because the lower piece is directly attached to the vehicle frame which permits the transfer of vibrations and noise from the machine into the pod and the joint between the two pieces allows leakage of air from the pod, such as conditioned air in the summer, and permits noise, dirt, fumes and other outside elements to enter the pod. Two piece pods also suffer from the increase in time and labor to remove the lower piece in order to service the components under the pod. Two piece pods are less aesthetically pleasing because the two pieces often are not perfectly aligned and present a disjointed appearance, more so if the lower piece if further broken down into additional removable panels. Two piece pods can also be more costly.

As such, there is a need for a cost effective single pod that can be used in connection with a manual controlled pump.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

The pod, as shown in at least FIGS. 1-23, is able to rotate or tilt forward without having to detach the operator controls in the pod from the manual controlled pump. The single pod is also isolated from the machine frame to prevent the transfer of noise and vibrations from the frame to the pod.

Figure 1:
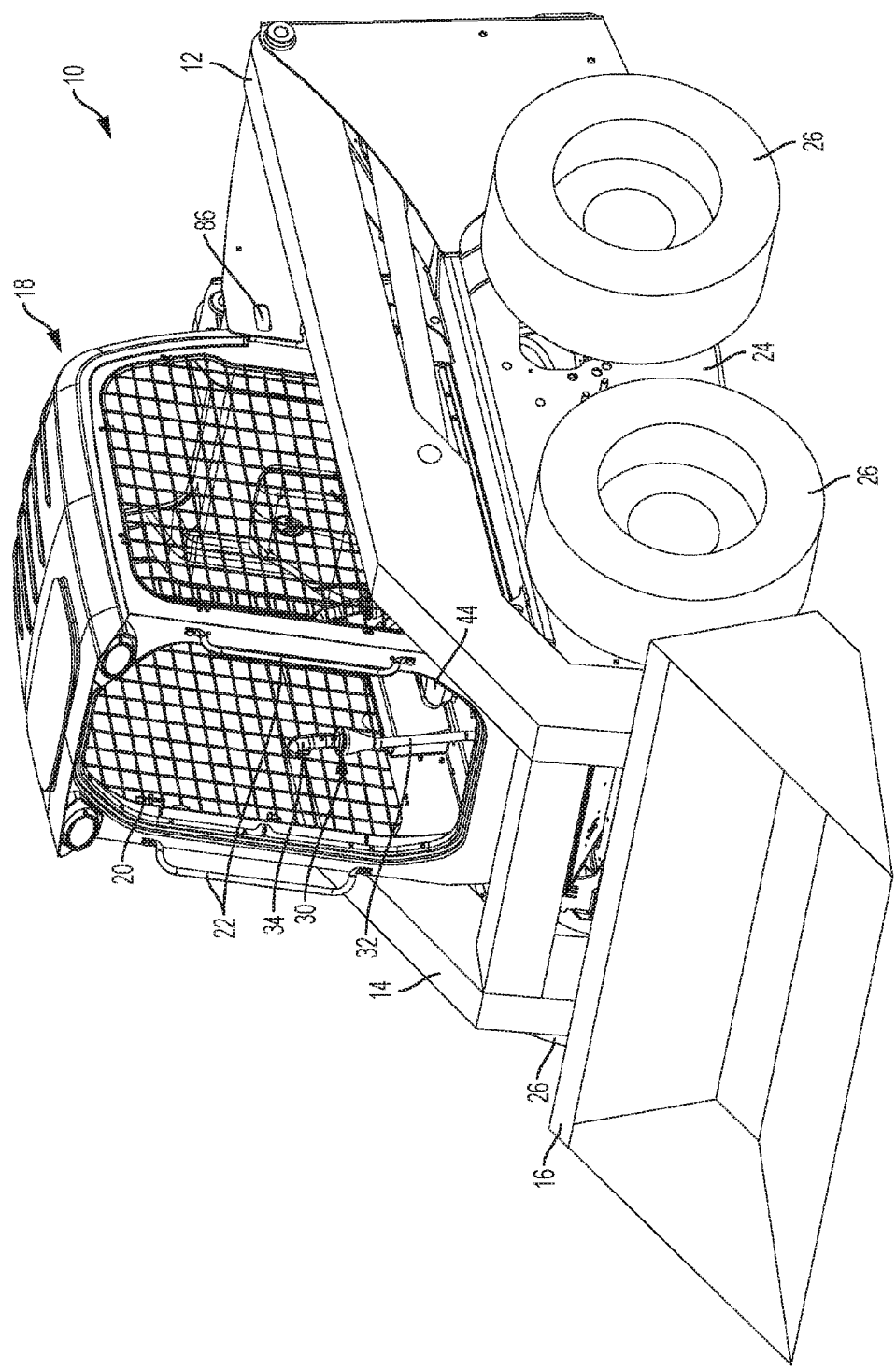
FIG. 1 is a side perspective view of a skid steer loader with a pod in a closed position.
Figure 2:
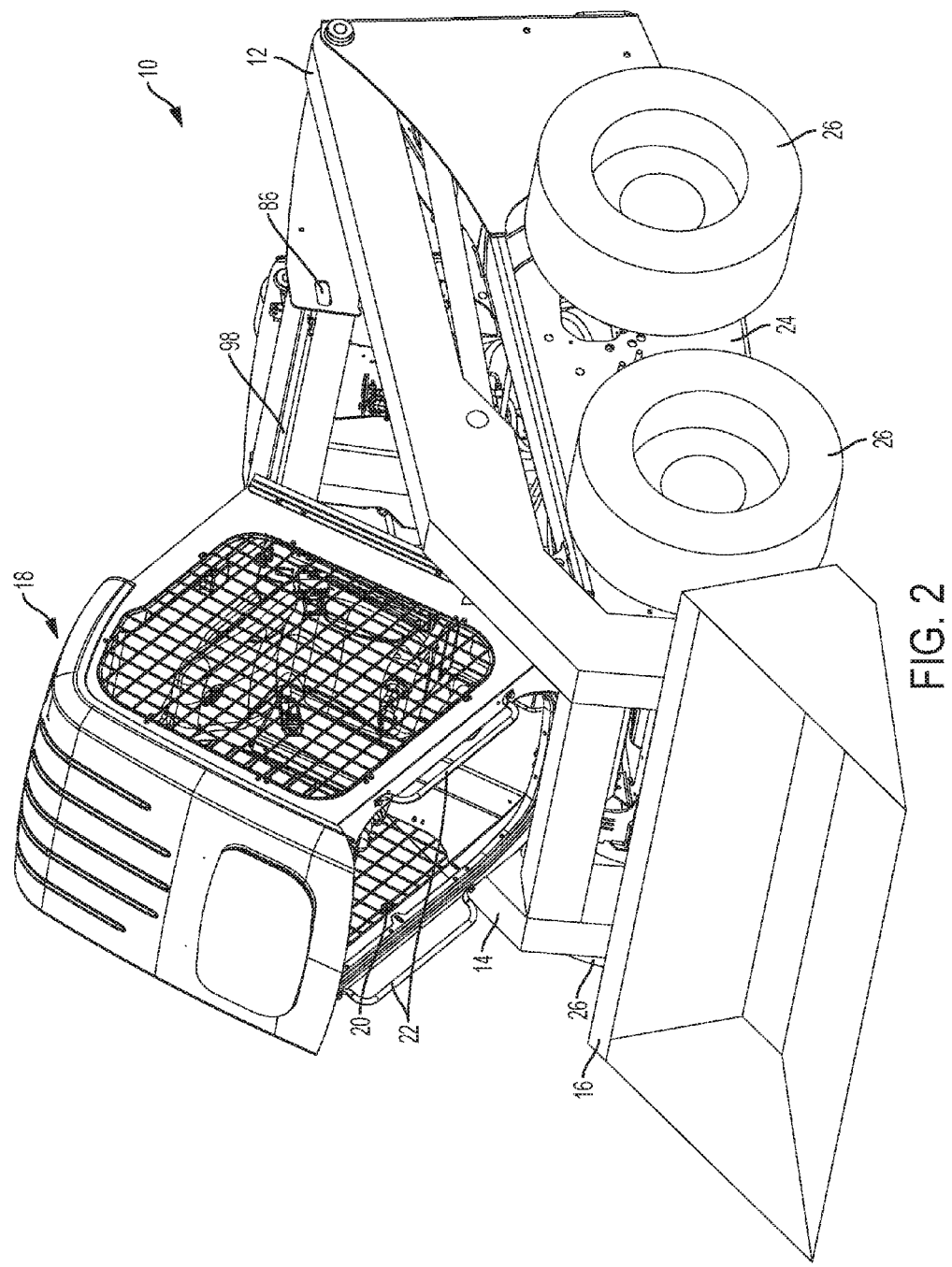
FIG. 2 is a side perspective view of the skid steer loader of FIG. 1 with the pod in an opened position.
Figure 3:
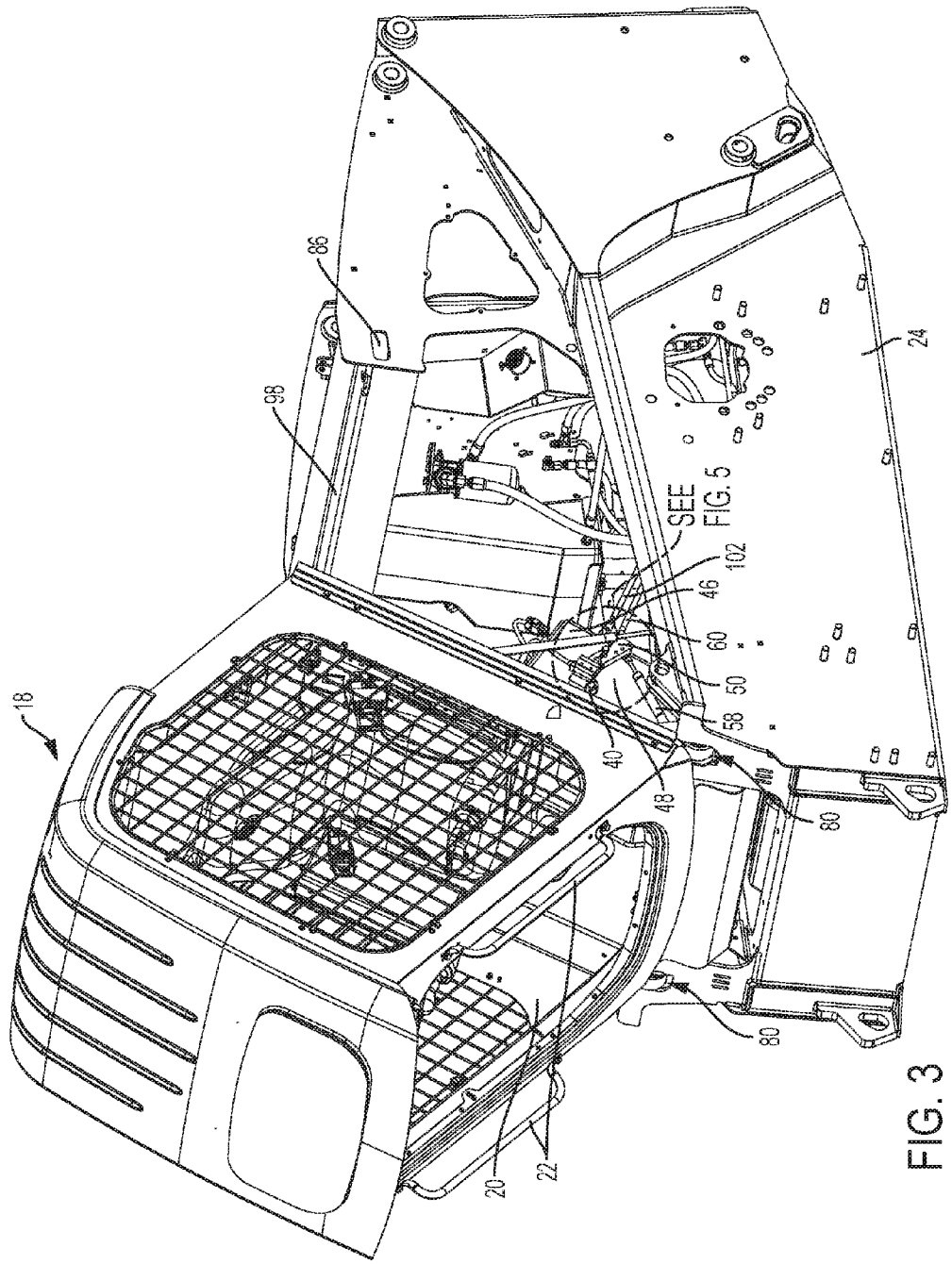
FIG. 3 is a side perspective view of the frame and the pod in an opened position.

The skid steer loader 10 shown in FIGS. 1-2 includes a pair of lift arms 12, 14 that operate to work an implement 16, in the example shown a bucket. The enclosure for the operator 18, or cabin or pod, has an entrance 20, in this case a door, through which the operator may enter and exit the pod and handles 22. The skid steer loader 10 includes a frame or body 24 to which the pod 18 is connected, as will be described further below, and a pair of wheels 26 on each side to move the vehicle across the ground. The skid steer loader 10 could alternatively use other known systems for moving a vehicle across the ground, for example, tracks. As seen in FIGS. 2-3, the pod 18 may be rotated, tilted or pivoted so as to provide access to components under and behind the pod, for example, the manual controlled hydrostatic pump 28. Although the description and FIGS. 1-23 show, describe and/or use a skid steer loader, the invention could be used with any vehicle having a cabin for which it is desirable to rotate.

One element of a manual controlled pump is that the operator controls 30 are connected to the manual controlled pump by linkages. The operator control 30 shown in FIG. 4. includes a control lever 32 with a joystick 34. The operator uses the operator controls 30 by working the joystick 34 with one hand and rotating the control lever 32 forward or backward. A pod may include one or more operator controls 30 and often includes two, one for each hand of the operator. The joystick 34 may permit the operator to control the work implement 16 while the rotation of the control lever 32 causes the skid steer loader 10 to move across the ground, for example, by actuating the manual controlled hydrostatic pump and the ground engaging members, wheels 26 or tracks. Other configurations for operator controls 30 are known in the art and the control lever 32 could control any movable members such as the wheels or tracks 26, lift arms 12, 14, or work implement 16. For example, the joystick 34 could cause movement and steering of the drive system, wheels 26 or tracks and the control lever 32 could control the work implement 16. Although the foregoing will discuss the connection of a single operator control 30 to the manual controlled hydrostatic pump, in the example below the operator's left operator control 30, a reciprocal configuration could be used if it is desired two have more than one operator control 30.

One benefit of having operator controls 30 that are connected to a manual controlled pump by linkages, is the ability to adjust the controls to the preference of the operator in a quick and efficient manner. In the embodiment shown in FIG. 4, the control lever 32 and, thereby, the joystick 34, is attached to an adjustment plate 36, such as by welding. The adjustment plate 36 is attached to a coupling plate 38, such as by bolting. The coupling plate 38 is attached to an axle 40 such that when the control lever 32 is tilted or pivoted, the axle is rotated.

Figure 4:
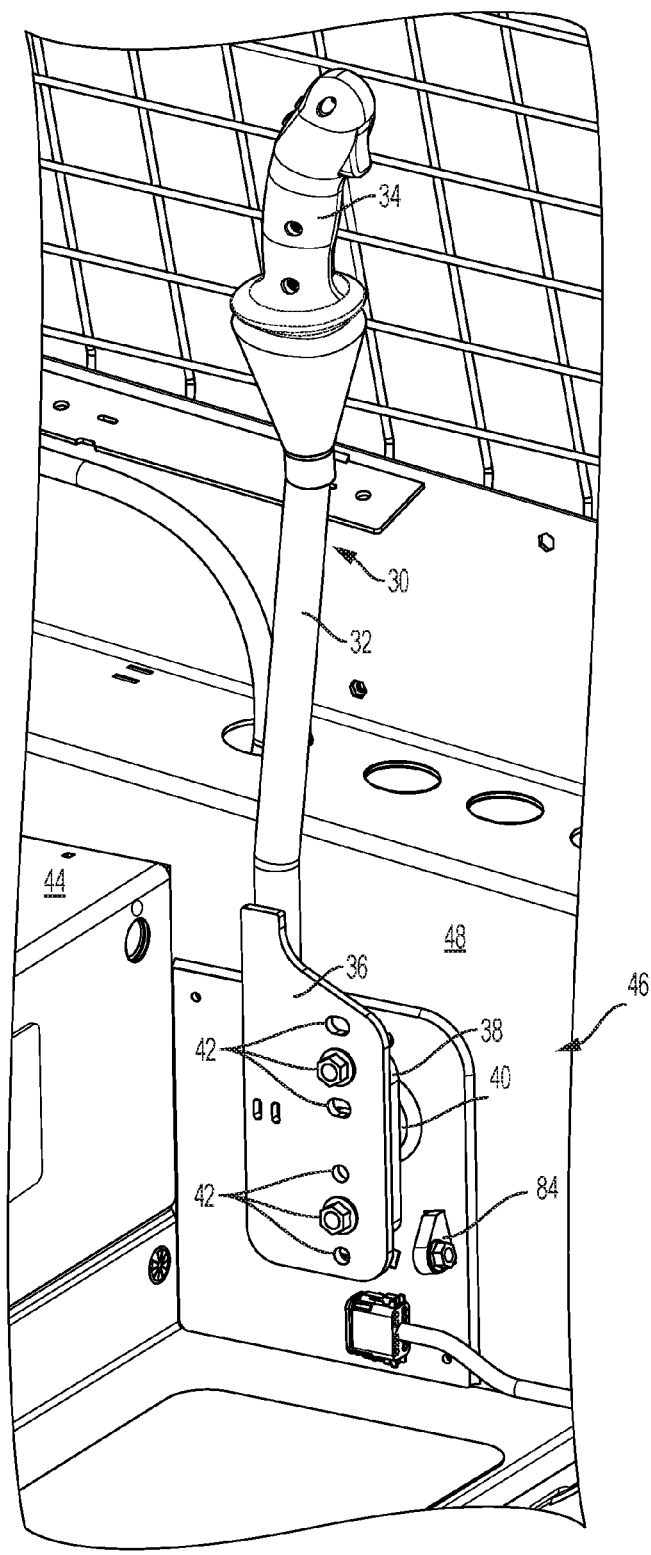
FIG. 4 is a side perspective view of an operator control from within the pod.

The adjustment plate 36 shown in FIG. 4 has a number of slotted mounting holes 42. The mounting holes 42 allow the operator control 30 to be raised or lowered, moved to or from the seat 44 and/or tilted as desired by the operator from within the cabin 18. This eliminates the guesswork often encountered by pods using a two piece pod, wherein adjustments to the operators controls 30 are performed with the top piece of the pod open, but verification of the adjustments must be made with the to pieve of the pod closed. To adjust such operator controls 30, the pod is rotated away from the frame and the operator controls 30 adjusted, guessing as to their desired placement with respect to the pod. Then the pod can be rotated back and the operator controls 30 tested to see if they were correctly adjusted. Although FIG. 4 shows one configuration of mounting holes 42, the number and orientation can be selected based upon the adjustability desired. Stops 84 can also be added to limit the range of motion of the operator controls 30.

The operator control 30 is connected to the axle 40 in the footwell portion 46 of the pod 18 as seen in FIG. 3. The axle 40 extends through a sidewall 48 of the footwell portion 46 and is connected to a steering arm 50. The exterior end 56 of the axle 40 is shown as a squared end in FIG. 5. A clevis 54 at one end of the steering arm 50 has an opening sized to receive the squared end 56 of the axle 40 and a bolt is used to secure the axle to the steering arm such that rotation of the axle, for example, by the operator control 30, causes rotation or pivoting of the steering arm.

Figure 5:
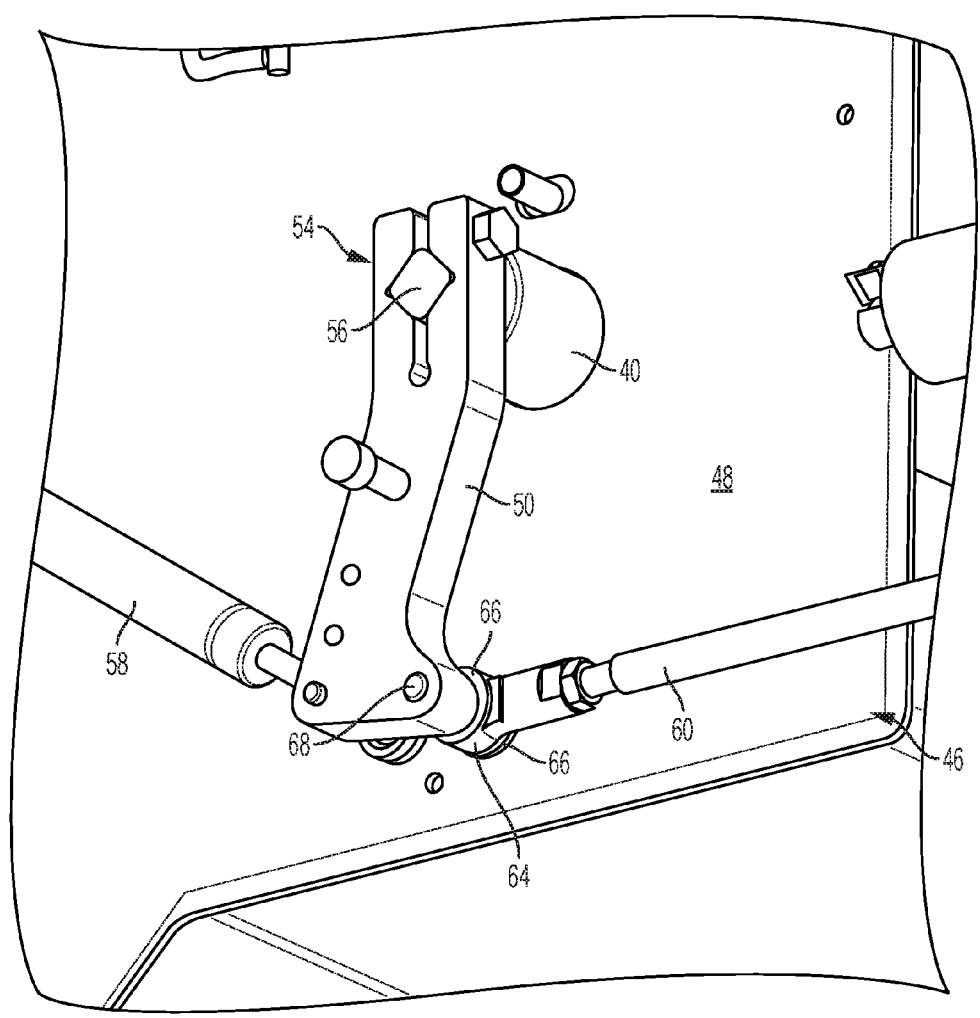
FIG. 5 is an enlarged perspective view of the steering arm taken along the line 5 in FIG. 3.

The other end of the steering arm 50 shown in FIG. 5 is connected to a damper 58 and a linkage rod 60. The linkage rod 60 connects the steering arm 50 to the manual controlled pump 28 by a pintle arm 62. At one end of the linkage rod 60 is a ball end 64 with a bore there-through. A washer 66 is placed on each side of the ball end 64 and a bolt 68 is inserted through the washers and the ball end and secured in the steering arm 50. Because the linkage rod 60 is not straight, as most clearly seen in FIG. 6, the ball end 64 allows a small amount of rotation or angle displacement between the linkage rod and the steering arm 50 when the pod 18 is rotated.

Figure 7:
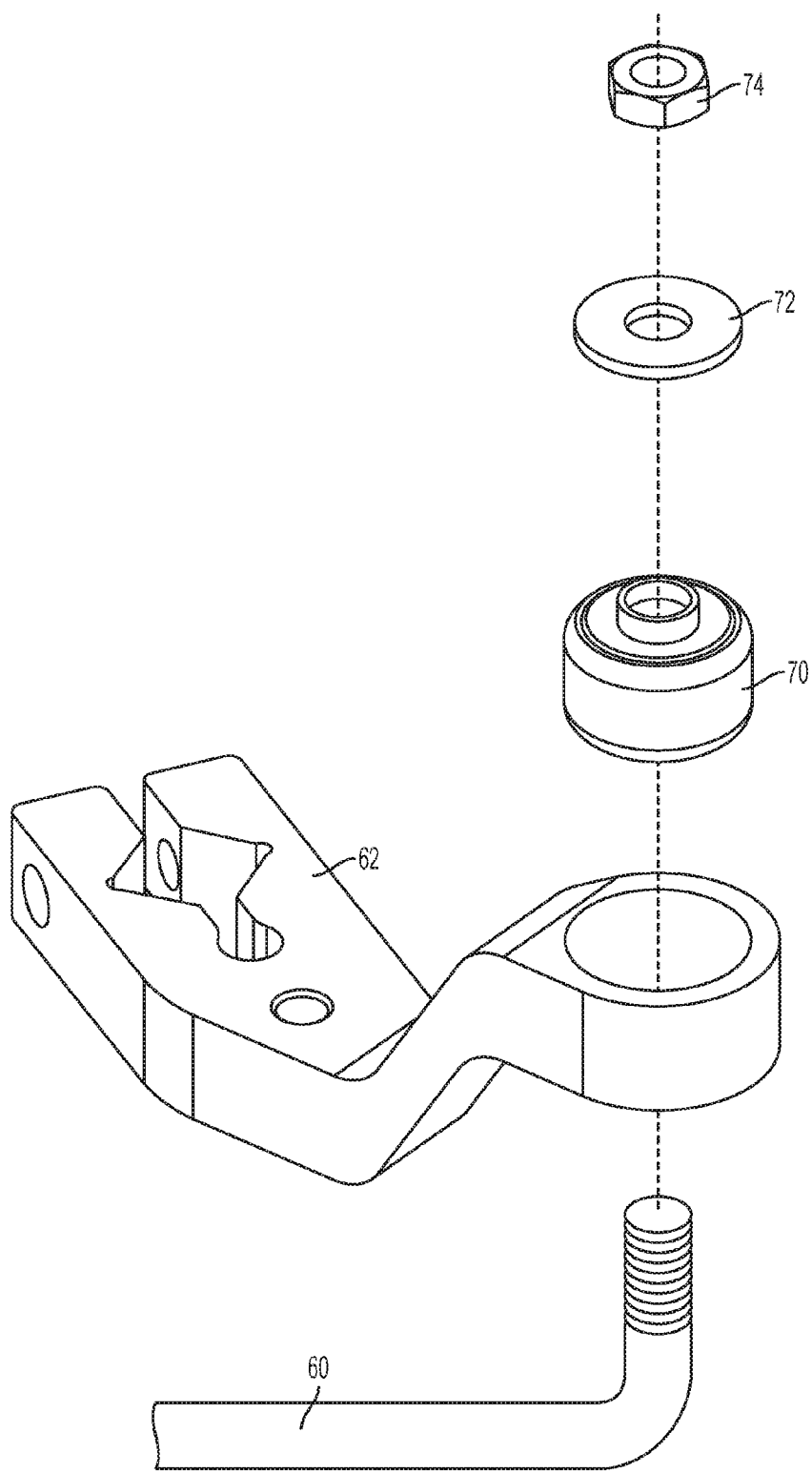
FIG. 7 is an enlarged, exploded perspective view of the pintle arm taken along the line 7 in FIG. 6.

As seen in FIG. 7, at the second end of the linkage rod 60, is an upturned end that is inserted through a hole in the pintle arm 62. A rubber bushing 70 is positioned between the linkage rod 60 and the pintle arm 62. A washer 72 is placed over the upturned end of the linkage rod 60 and onto the top of the rubber bushing 70 and a nut 74 is threaded onto the end of the linkage rod to prevent the linkage rod from pulling out of the pintle arm 62. This connection performs similar to a ball and socket joint and, like the ball end 64 of the linkage rod 60, allows a small amount of rotation or angle displacement between the linkage rod and the pintle arm 62 when the pod 18 is rotated. The rubber bushing 70 also prevents the transfer of noise and vibrations from the vehicle and/or pump to the pod.

Figure 6:
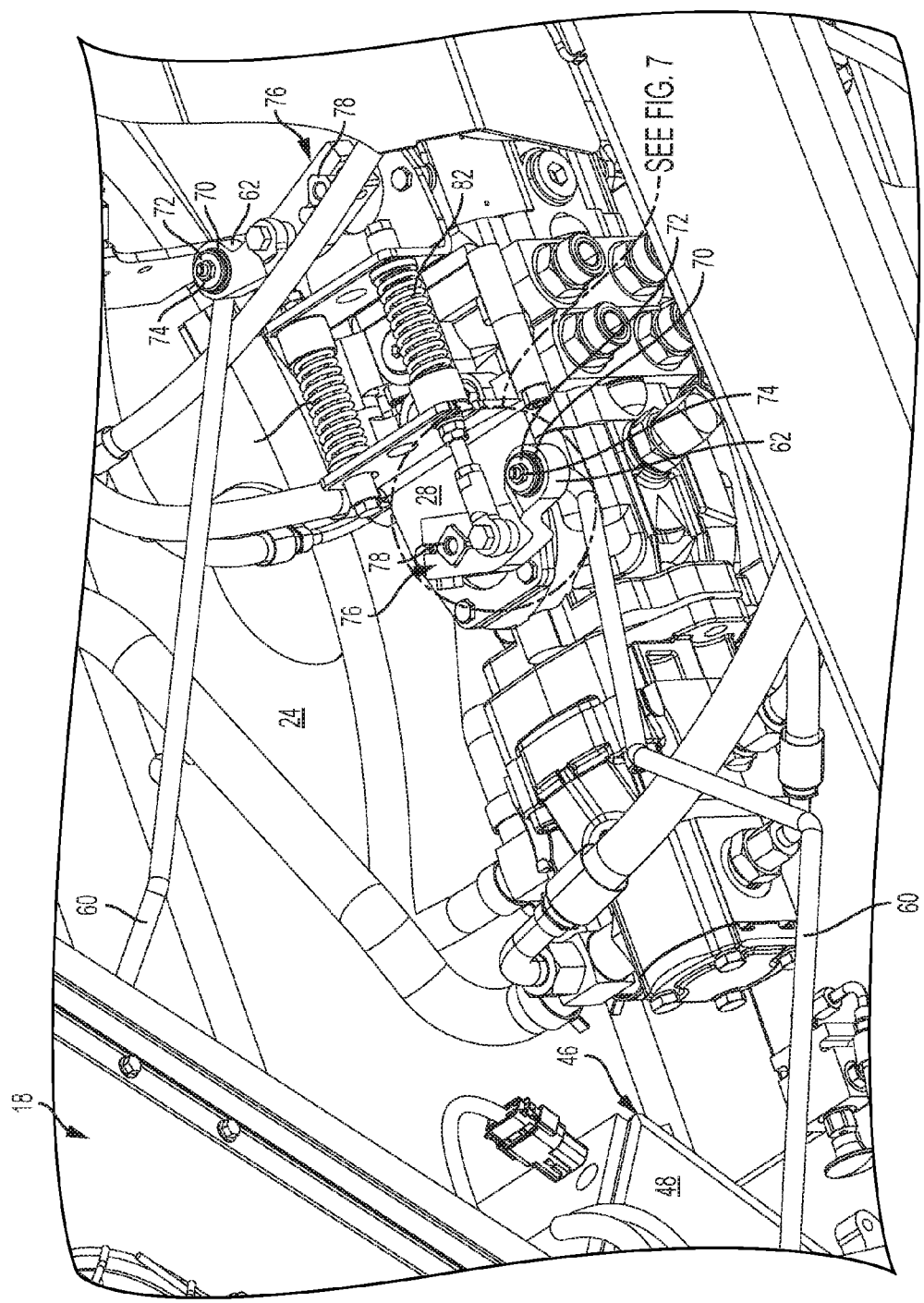
FIG. 6 is a perspective view of the components beneath the pod with the pod in an opened position.

The pintle arm 62 is connected to the manual controlled pump 28 by a pintle clevis 76. The pintle clevis 76 has an opening sized and shaped to receive a square nut 78 such that when the pintle arm is rotated the square nut 78 is turned and the manual controlled pump 28 responds accordingly. For example, when the control lever 32 of the left operator control 30, as viewed from the operator seat 44, is rotated forward, the axle 40 will rotate counterclockwise. The rotation of the axle 40 will cause the bottom of the steering arm 50 or rotate rearward. The rotation of the steering arm 50 will cause the linkage rod to be pushed rearward in a planar action which will cause the pintle arm 62 to rotate rearward. The rotation of the pintle arm will cause the square nut 78 to rotate counterclockwise, in the view as seen in FIG. 6. The rotation of the square nut 78 will open a valve (not shown) in the manual controlled pump 28 operably connecting it to the wheels on the left side of the machine causing them to rotate. If the control lever 32 of each operator control 30, in the embodiment seen in FIG. 1, were pushed forward, the skid steer loader 10 would move forward.

In the embodiment described above, the connection of the operator controls 30 to the manual drive hydrostatic pump includes a five bar or arm linkage made up of the pivot joint 80 (discussed further below), the steering arm 50, the linkage rod 60, the pintle arm 62 and the manual controlled hydrostatic pump 28 when the pod 18 is rotated. When the pod 18 is in its closed position, the bar between the pivot joint 80 and the steering arm 50 is inactive and the connection becomes a four bar linkage. However, more or less bars or arms could be used without defeating the spirit of the invention. There is a five bar linkage in the embodiment shown and described in FIGS. 1-8 for each of the two operator controls 30 when the pod 18 is rotated and a four bar linkage when the pod 18 is in its closed position. In the embodiment shown, each five bar linkage allows the operator to control the drive system for one side of the skid steer loader 10.

A spring 82 can also be rotatably connected to the pintle arm 62 to move the pintle arm to the neutral position when not engaged. The spring(s) 82 can help smooth out or dampen the rotation or tilting of the pintle arm 62 so as prevent sudden or abrupt transfers of the rotation of the pintle arm to the square nut 78 and ultimately the manual controlled pump 28. The spring(s) 82 can also provide a resisting force to the operator using the operator control(s) 30 or force feedback to indicate when the manual controlled pump is being moved from its neutral position.

The damper 58 is connected between the steering arm 50 at one end and the vehicle frame 24 at its second end. The damper 58 is sized and configured in order to dampen the rotation or tilting of the steering arm 50 so as prevent sudden or abrupt transfers of the rotation of the steering arm to the linkage rod 60 and ultimately the manual controlled pump. FIG. 3 shows the use of a damper 58, but could also include a mechanical or pneumatic spring or shock or another compressible or elastic member. Further, although only one damper 58 is shown on each side of the pod 18, multiple dampers on each side could be used.

Figure 8:
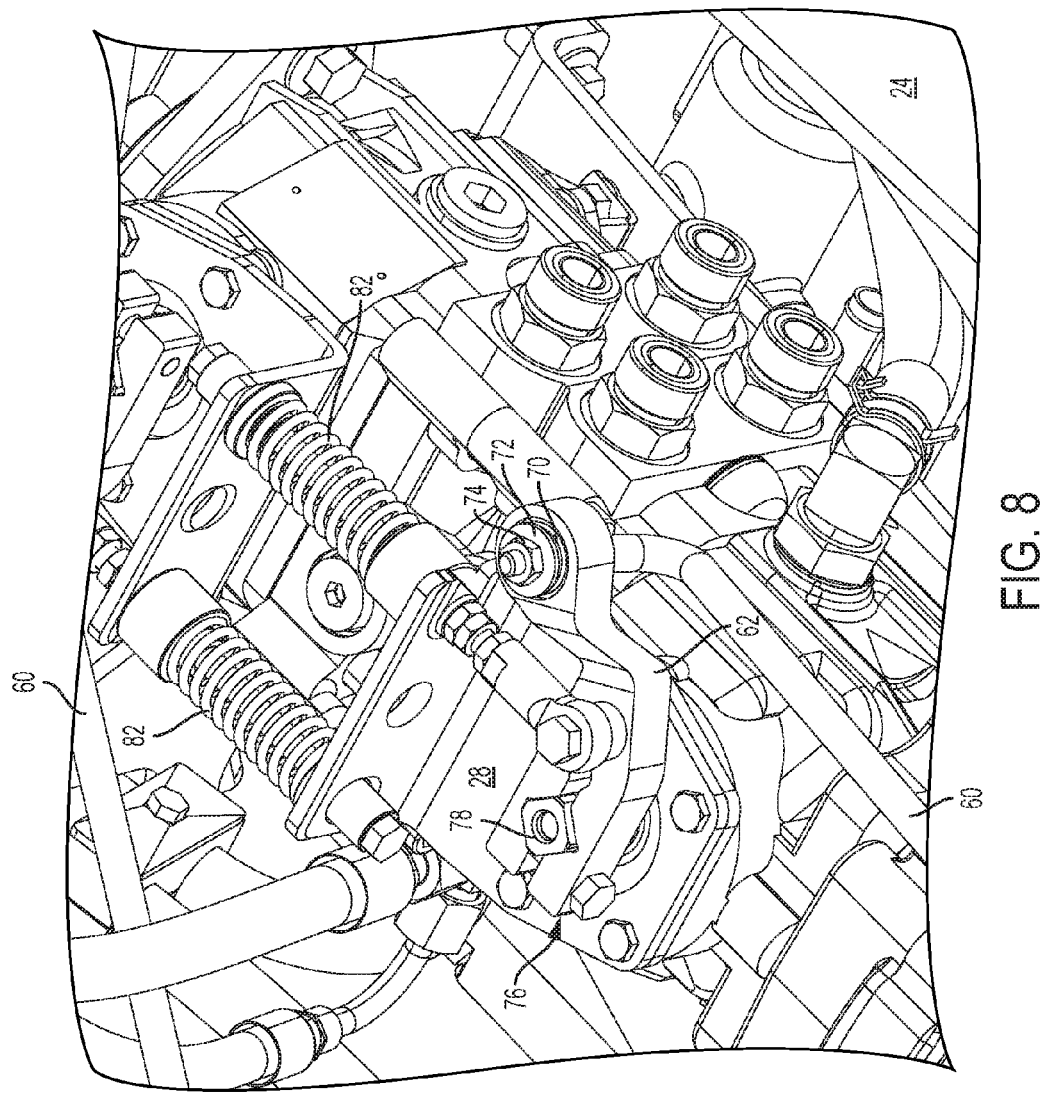
FIG. 8 is a perspective view of the components beneath the pod with the pod in a closed position, but not shown.

As seen by comparing the pintle arms 62 as shown in FIG. 8 to those shown in FIG. 6, the pintle arms are rotated forward when the pod is rotated forward. The rotation of the pintle arms 62 forward, or towards the implement 16, in combination with the steering arms 50 rotation backwards, or towards the manual controlled pump 28, provide enough additional length such that the pod 18 can be rotated forward without disconnecting the operator controls 30 from the manual controlled pump. In the embodiment shown in FIG. 2, the pod 18 is shown rotated about fifty-five (55) degrees, however more or less rotation could be used without defeating the spirit of the invention.

Because the operator controls 30 can stay mechanically connected to the manual controlled hydrostatic pump 28 when the pod 18 is rotated, the skid steer loader 10 can be turned on or running while components, such as the manual controlled hydrostatic pump, are accessed. As described above, the pintle arms 62 need to be rotated forward as seen in FIG. 6, out of their neutral position seen in FIG. 8, in order for the pod 18 to be rotated forward. Rotation of the pintle arms 62 forward causes the hydrostatic pump to respond accordingly, such as by causing hydrostatic fluid to flow resulting in the wheels on one side of the machine to rotate. For safety, a brake could be set to be applied when the machine is started or before the pod 18 is rotated, for example by use of a sensor, such that the skid steer loader 10 drives against the brake. Allowing the pod to be rotated without disconnecting the operator controls 30 from the manual controlled hydrostatic pump 28 allows for service of the components under or behind the pod and while the skid steer loader 10 is running, such as during manufacturing in a factory, servicing in a shop or repairs in the field. Such a configuration makes possible adjustments, servicing and/or repairs that can only be accomplished or are easier to be accomplished while the skid steer loader is running and/or with the operator controls 30 operable.

Figure 9:
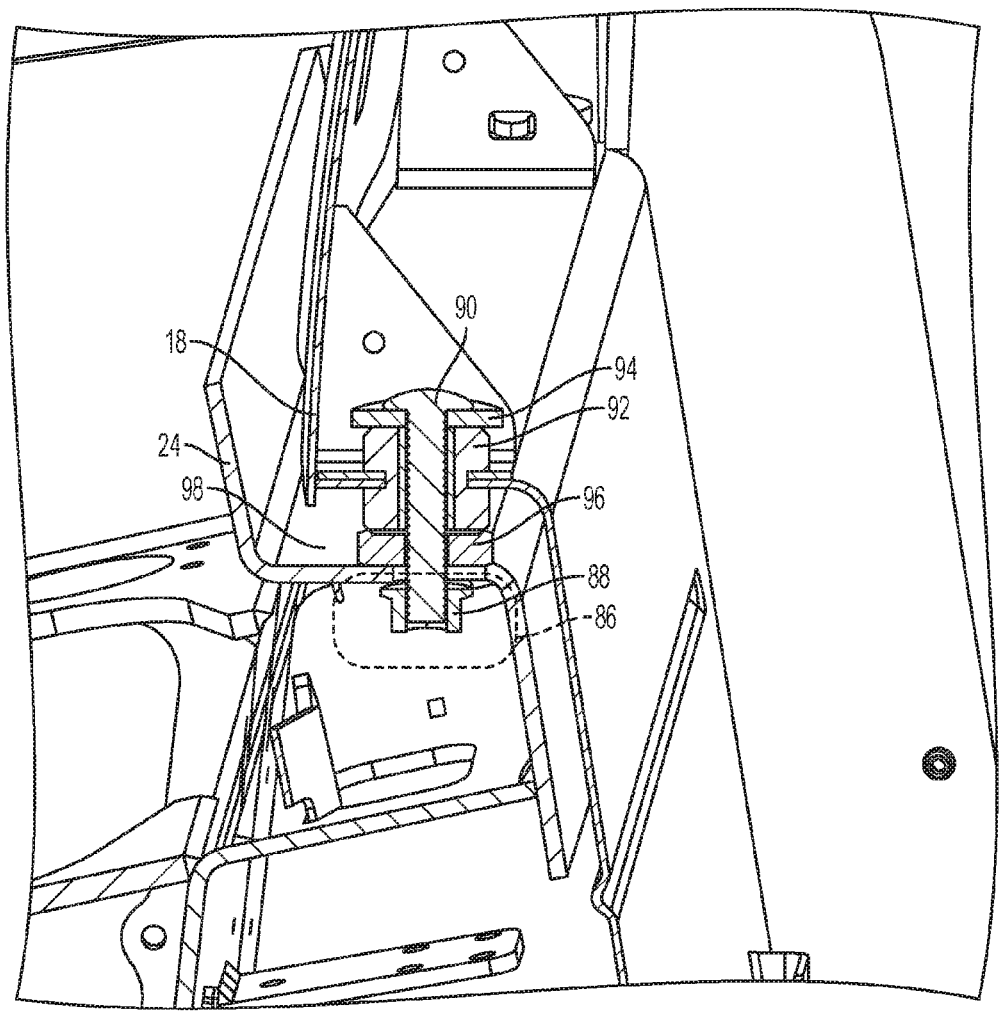
FIG. 9 is an enlarged cross-section view of a portion of the frame and pod secured together.

In order to secure the pod 18 in its normal operating or first position and prevent the undesired rotation of the pod, the pod is selectively secured to the frame 24. As seen in FIG. 1, there is an access hole 86 in the frame 24. The access hole 86 allows access to a nut 88. As seen in FIG. 9, the nut attaches to a bolt 90 that secures the pod 18 to the frame 24. When it is desired to rotate the pod 18 away from the first position, a wrench can be used through the access hole to remove the bolt 90. In one embodiment, a secure connection as describe above is provided on each side of the skid steer loader 10.

The secure connection can also include an isolating member. For example, as seen in FIG. 9, a rubber bushing 92 is inserted through and held by an opening in the pod 18. The bolt is inserted through a washer 94, then through the rubber bushing 92 and a threaded washer 96 is threaded onto the bolt. The threaded washer 96 secures the bolt 90 to the rubber bushing 92 and the pod 18 such that when the pod is rotated, the bolt, washer 94, rubber bushing and threaded washer rotate with and stay secured to the pod 18. When the pod 18 is rotated back to its normal operating position the bolt 90 will insert through a hole in the frame 24 and the threaded washer and, thereby, the pod 18 will rest on and be supported by the shoulder 98 of the frame 24. With the pod 18 in its normal operating position, the nut 88 can be attached to the bolt 90 to secure the pod to the frame 24.

The pod 18 is physically isolated from the frame 24 by isolating members, such as rubber bushing 70 and rubber bushing 92, described above, and rubber grommet 100, discussed further below, in order to reduce and inhibit noise and vibration from the frame from transferring to the pod.

The pod 18 shown in FIGS. 10 and 12-16 is assisted during rotation to make rotating the pod easier and accomplishable by a single person. In the embodiment shown in FIGS. 10 and 12, the pod may be rotated when about fifty pounds of force is applied in a pulling fashion on the pod, for example, the front handle(s) 22 by the door 20. However, the pod could be configured to require more or less force as desired without defeating the spirit of the invention.

FIGS. 10 and 12-16 show the use of a lift support such as gas springs 102, but could also include a mechanical or pneumatic spring, shock or damper. Further, although only one gas spring 102 is shown on each side of the pod 18, a single gas spring on one side or multiple gas springs on each side could be used.

Figure 10:
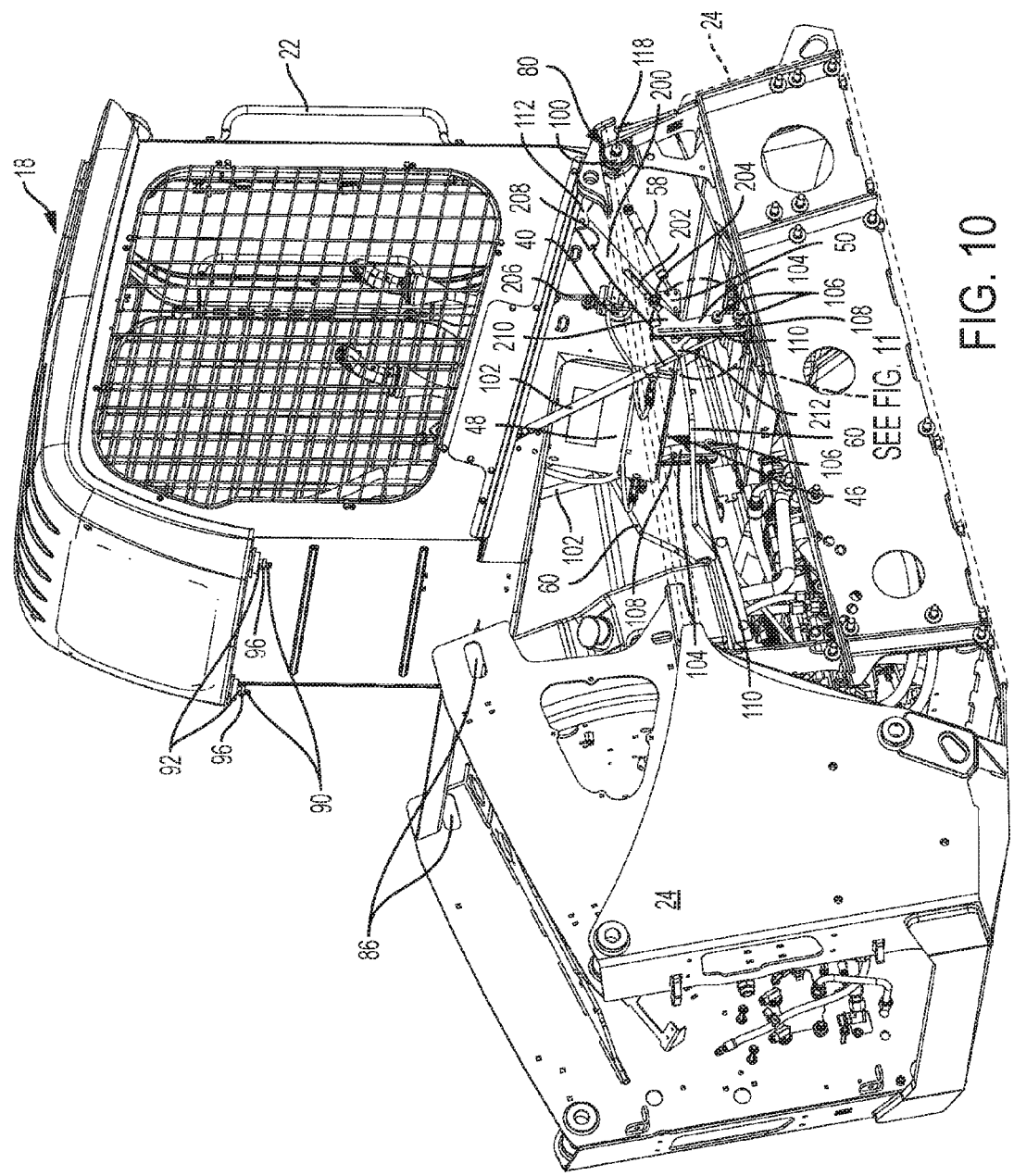
FIG. 10 is a perspective view of the frame and pod in a partially opened position.

One end of the gas spring 102, the tube portion of the gas spring as shown in FIG. 10, is rotatably attached to the pod 18, such as by a bolt. A second end of the gas spring 102, the rod portion of the gas shock as shown in FIG. 10, is slidably connected to the fame 24 such as by a slide plate 104. Once the gas spring 102 reaches the end of its stroke or extension the second end of the gas shock may slide up the slide plate 104 to allow the pod 18 to be further rotated into its fully opened position.

Figure 11:
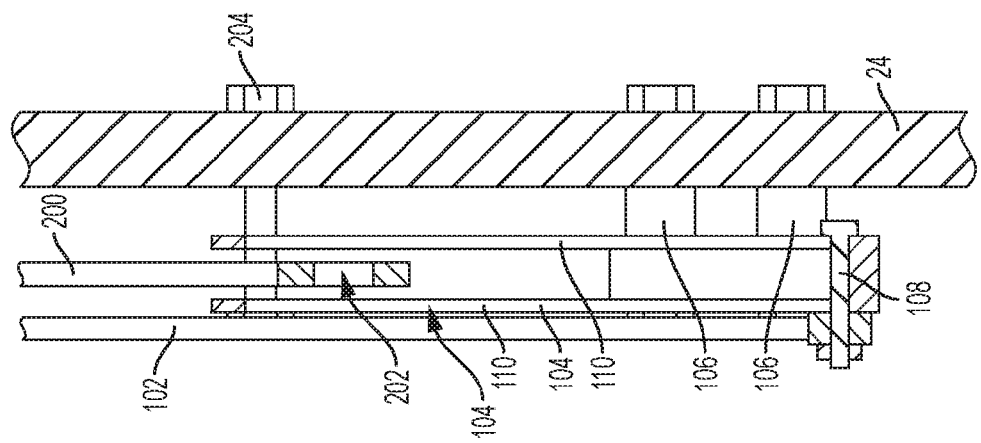
FIG. 11 is an enlarged elevation view of a slide plate of FIG. 10.

The slide plate 104 shown in FIG. 11 is generally 'U' shaped. The bottom of the slide plate 104 is attached to the side frame 24 of the skid steer loader 10, such as by bolting. Spacers 106 are used to keep the slide plate 104 spaced away from the frame 24. The rod portion of the gas spring 102 is located on the interior side of the forked portion of the 'U' shaped slide plate 104 and a bolt 108 is inserted through the forked portions of the 'U' shaped slide plate and then through the rod portion. A nut is attached to the bolt 108 to hold the configuration together. As seen in FIG. 10, the bolt 108 is located within the slot 110 of the slide plate 104, to allow the rod portion of the gas spring 102 to slide up and down the slot.

Figure 12:
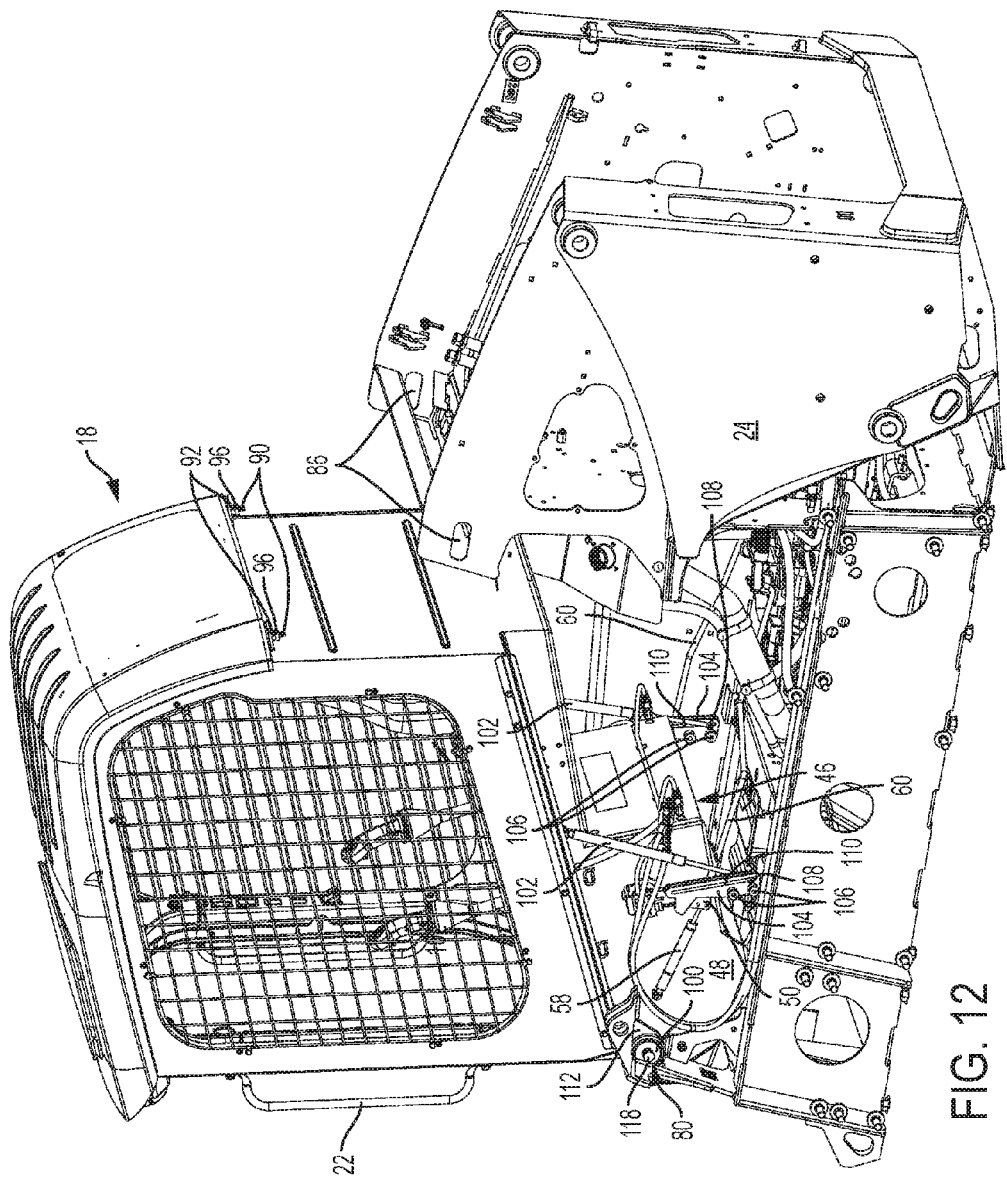
FIG. 12 is a perspective view from the other side of the frame and pod of FIG. 10.

As seen by comparing FIG. 10 to FIG. 12, the gas spring 102 on the first or right side of the skid steer loader 10, when sitting in the pod 18, is attached to the pod at a first distance back from the front and the left gas spring 102 on the second or left side of the skid steer loader is attached to the pod at a second distance back from the front, which is not the same as the first distance. In other words, in the embodiment seen in FIGS. 10 and 12, the right and left gas springs 102 are not located directly across the pod 18 from one another. The right gas spring 102 is located further back than the left gas spring 102. Similarly, the right and left slide plates 104 could be located at different distances back from the front. The amount of force needed to rotate the pod 18 depends on the location of the pod's center of gravity in relation to the pivot joint 80 and is therefore, not consistent. The above described configuration allows a different amount of assistance to be provided by the gas springs 102 to the pod 18 as it is rotated.

For example, when the pod is first rotated upwards, from its closed position and towards its opened position, both gas springs 102 push the pod. Because the center of gravity of the pod 18 is closer to the rear, more force is required to push the pod upwards. When the pod 18 reaches generally about a third of the way towards the opened position, the right gas spring 102 will be generally at full stroke, as seen in FIG. 10, while the left gas spring 102 is generally about midway through its stroke, as seen in FIG. 12. At this position, the rod end of both gash springs 102 are seated at the bottom of the slots 110 due to the gas springs pushing the pod 18 upwards.

As the pod 18 is rotated further forward, the rod end of the right gas spring 102 will begin to be pulled up the slot 110, while the left gas spring 102 is still exerting a force on the pod. At this position, the center of gravity of the pod 18 is closer to the pivot joint 80. Therefore, the pod 18 does not need as much force to continue to rotate forwards.

Figure 13:
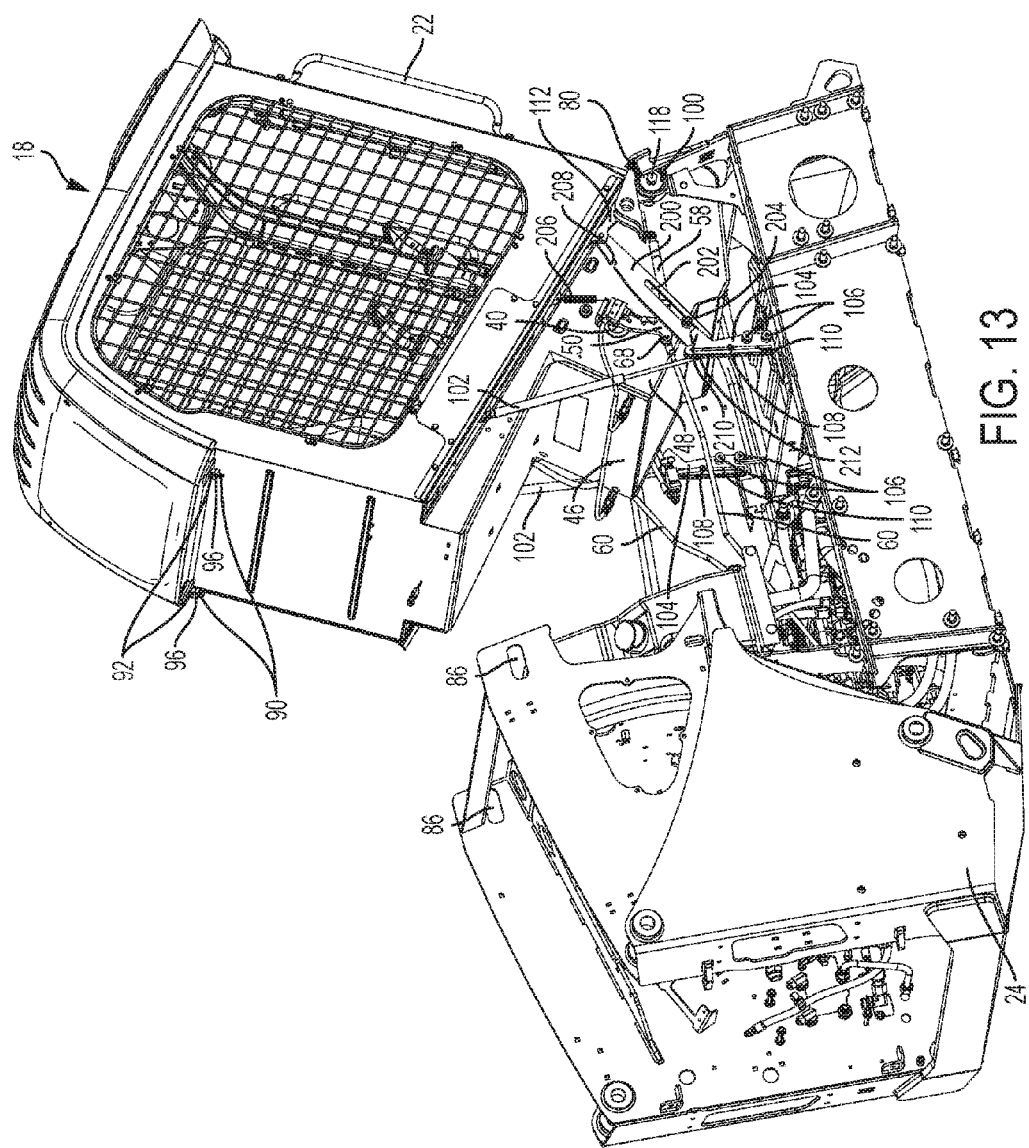
FIG. 13 is a perspective view of the frame and pod in a partially opened position.
Figure 14:
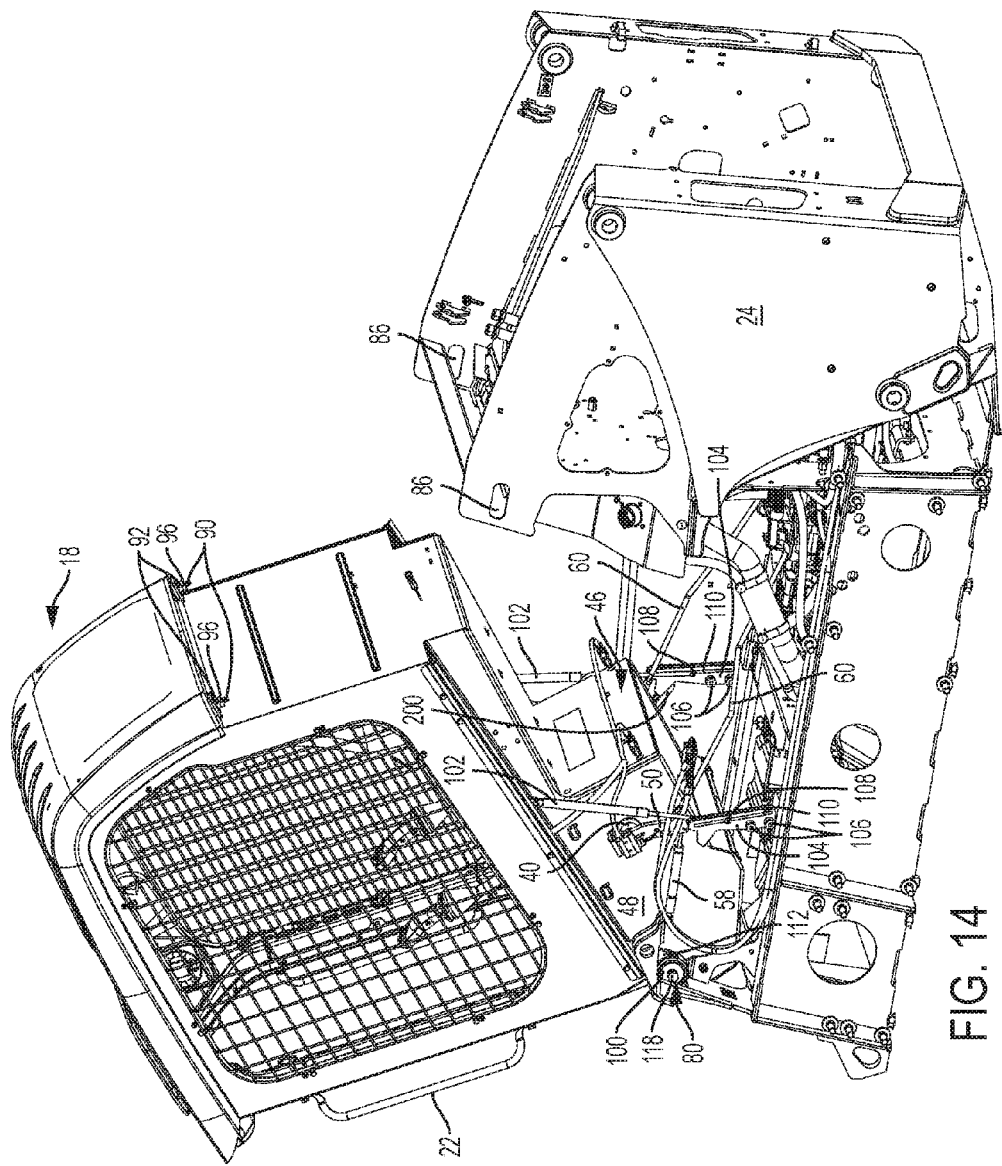
FIG. 14 is a perspective view from the other side of the frame and pod of FIG. 13.

When the pod 18 reaches generally about two-thirds of the way towards the opened position, the rod end of the right gas spring 102 will be at about midway up the slot 110 of the right slide plate 104, as seen in FIG. 13, while the left gas spring 102 will be generally at full stroke, as seen in FIG. 14. At this position, the center of gravity is generally above the pivot joint 80 and therefore the pod 18 can be rotated forward to its fully opened position by the exertion of a small force by a single person. As the pod 18 is rotated further forward, the rod end of the right gas spring 102 will be pulled further up the slot 110, while the left gas spring 102 will begin to be pulled up the slot.

Figure 15:
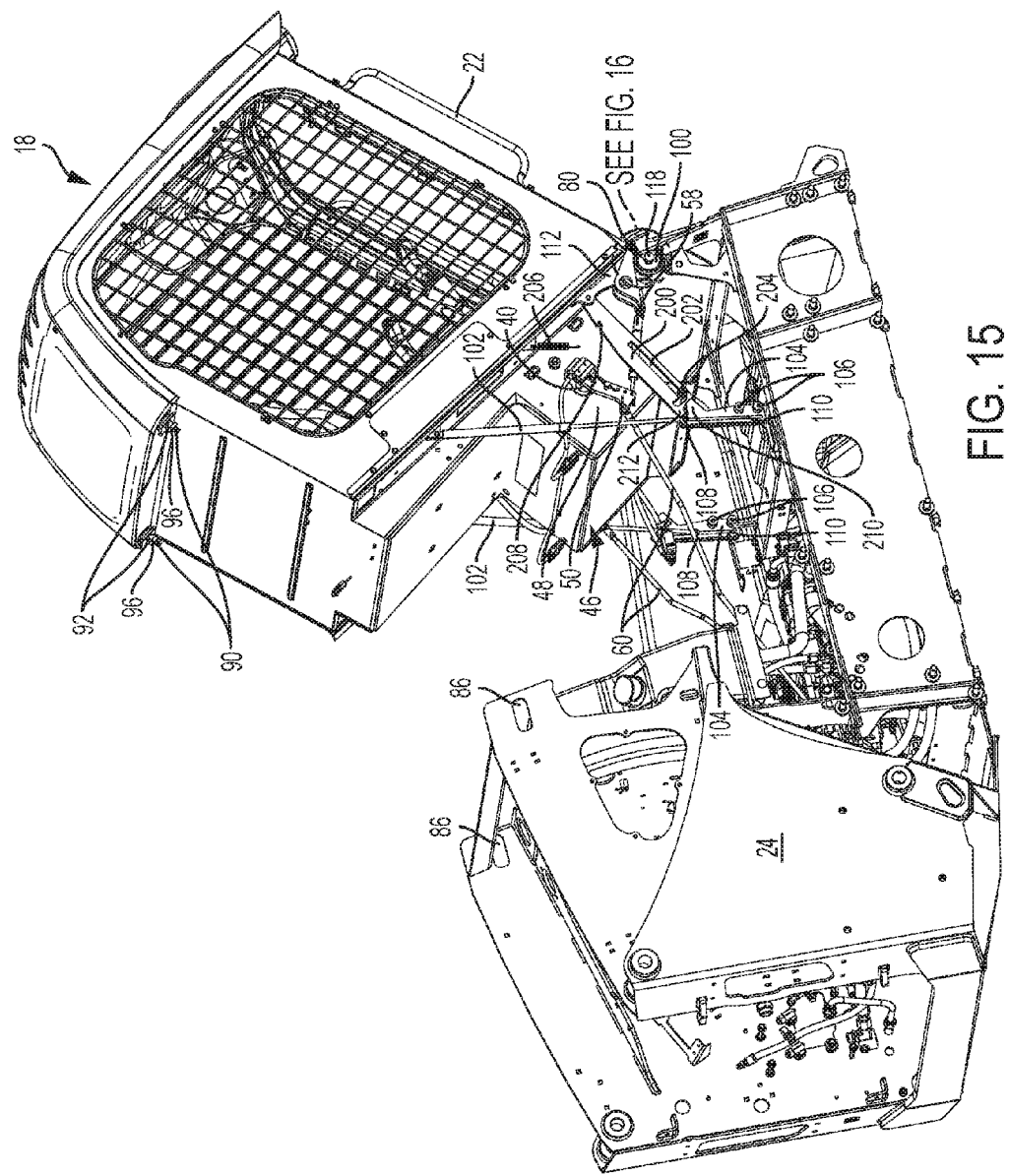
FIG. 15 is a perspective view of the frame and pod in a fully opened position.
Figure 16:
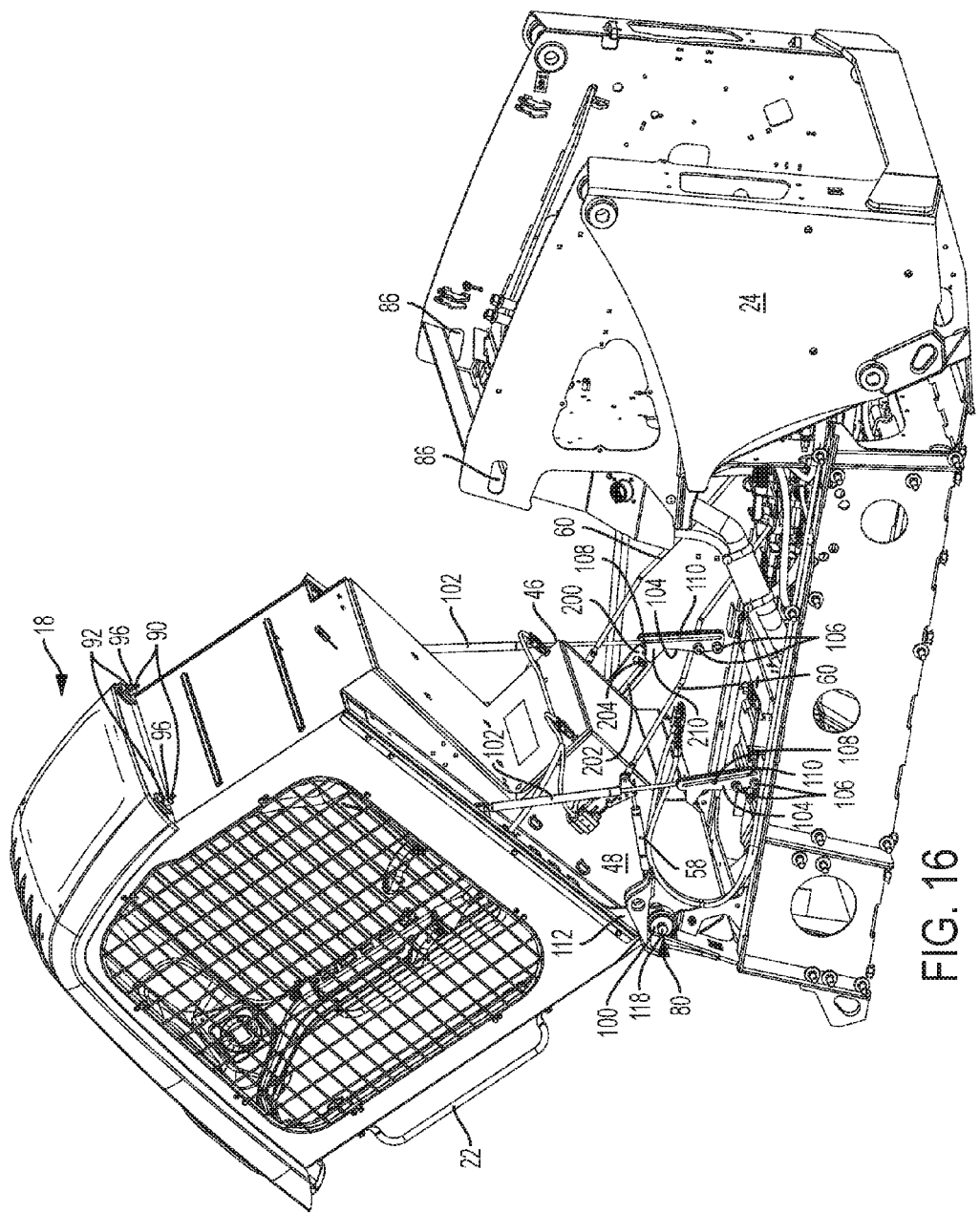
FIG. 16 is a perspective view from the other side of the frame and pod of FIG. 15.

When the pod 18 is in its fully opened position, the rod end of the right gas spring 102 will be near the top of the slot 110 of the right slide plate 104, as seen in FIG. 15, while the left gas spring 102 will be at about midway up the slot 110 of the right slide plate 104, as seen in FIG. 16.

Figure 17:
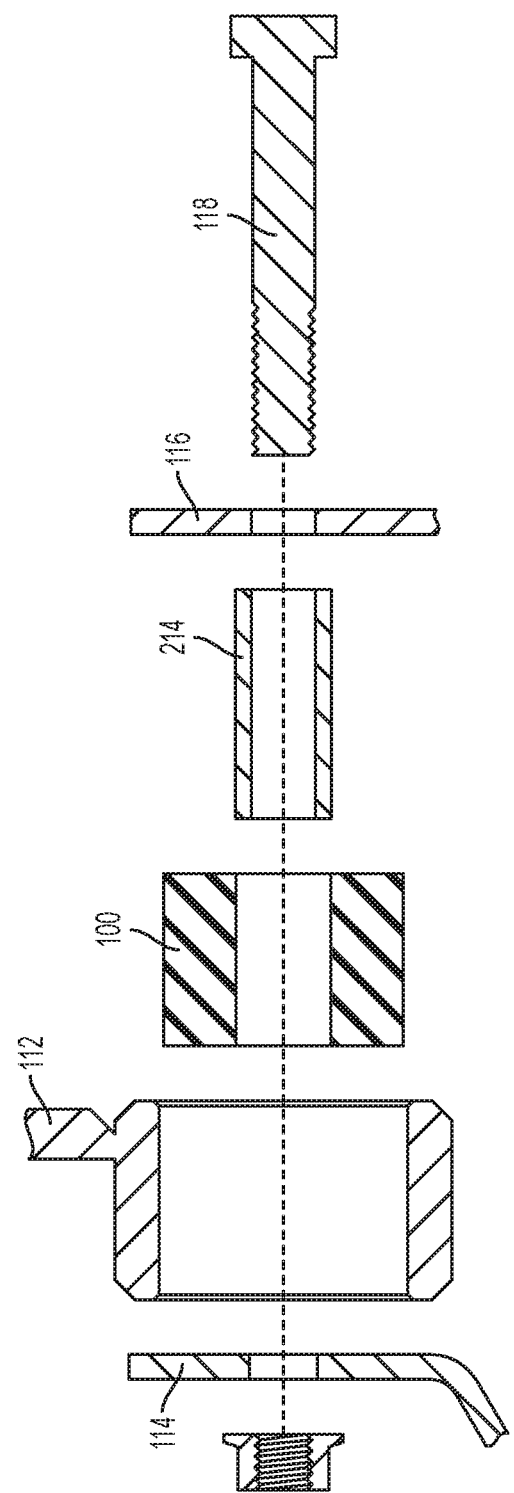
FIG. 17 is an enlarged exploded view of the pivot joint of FIG. 15 taken along the line 16.
Figure 18:
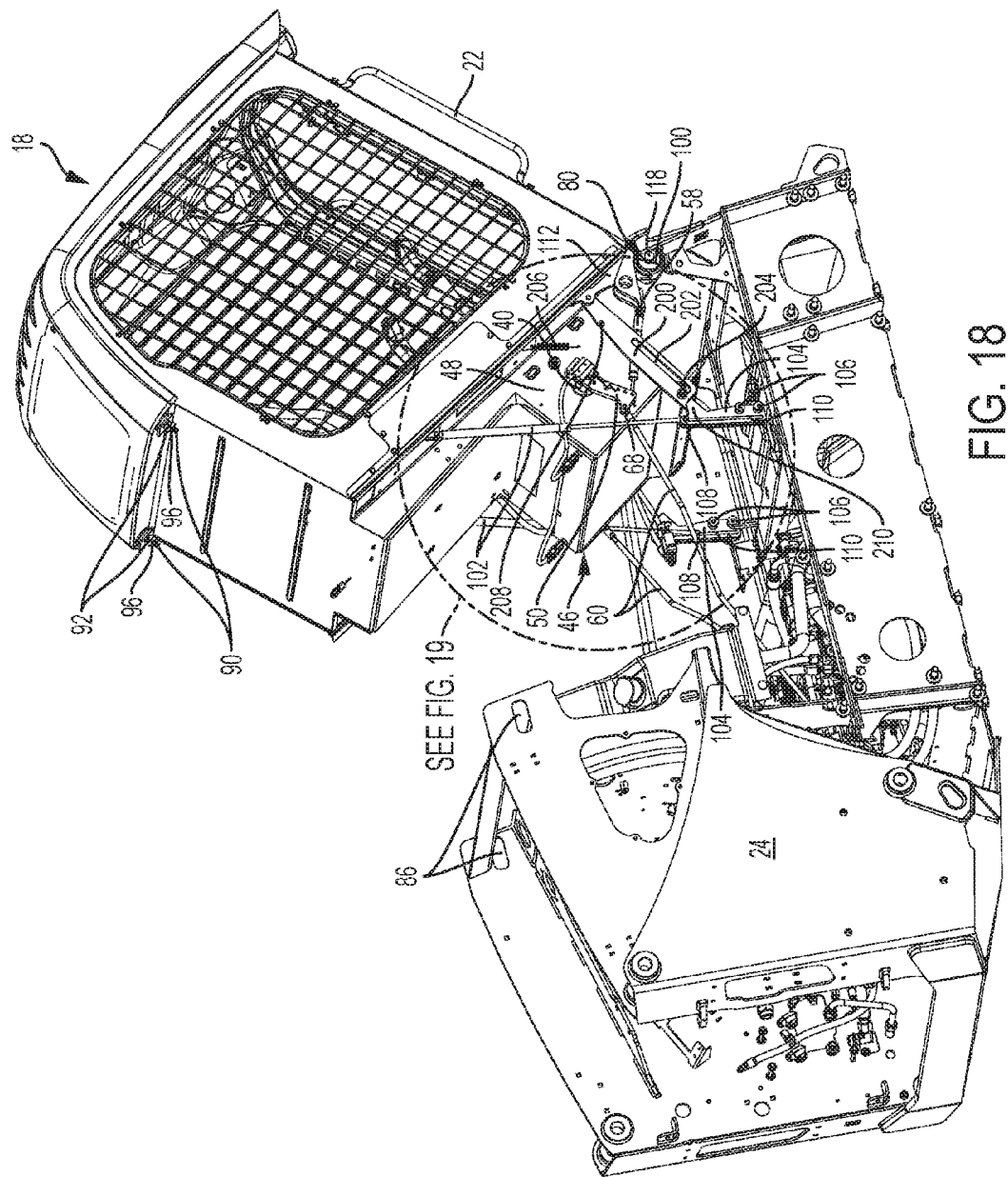
FIG. 18 is a perspective view of the frame and pod in a fully opened position and the hold open arm in the hold open position.

The pivot joint 80, as seen in FIG. 17, generally includes a projection 112 from the pod 18 that is located between a first 114 and second 116 portion of the frame 24. The projection 112 includes a bore in which a rubber grommet 100 is seated. A hole in the rubber grommet aligns with holes in the first 114 and second 116 portion of the frame 24. A bolt 118 is inserted through the hole of the first portion 114 of the frame 24, through the hole of the rubber grommet 100 and then through the hole of the second portion 116 of the frame 24. A nut is attached to the end of the bolt 118 to pivotally attach or rotatably connect the pod to the frame 24. The rubber grommet 100 isolates the pod 18 from the machine frame 24 to prevent the transfer of noise and vibrations from the machine frame to the pod.

Figure 19:
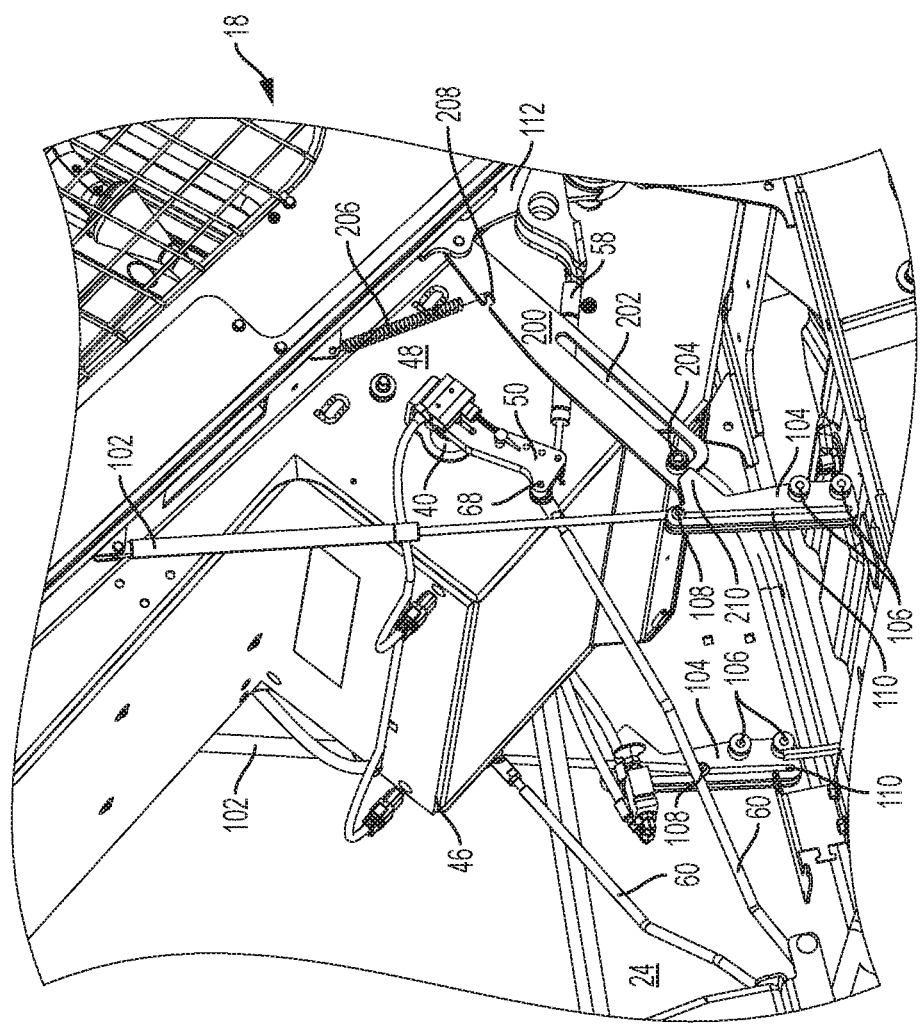
FIG. 19 is an enlarged perspective view of the hold open arm of FIG. 18 in the hold open position taken along the line 19.

In order to prevent the pod 18 from over rotating and/or from rotating back towards the closed position, the embodiment shown in FIGS. 18-23 includes a pod stand or hold open plate 200. The hold open plate 200 shown in FIG. 19 is rotatably mounted to the pod 18 at one end and includes a slot 202 with an elongated portion and an upturned portion. A bolt 204 engaged in the slot 202 is attached to the side of the machine frame 24 to slidably connect the hold open plate to the frame. When the pod 18 is in its closed position, the bolt 204 is further away from the upturned portion than when the pod is in its opened position. As the pod 18 is rotated towards its opened position, the hold open plate 200 slides forward on the bolt 204. When the bolt 204 is in the elongated portion of the slot 202 is generally referred to as the first or rotate position.

The size and position of the slot 202 is such that when the pod 18 reaches its fully opened position, the blot 204 will be at the end of the elongated portion to prevent the pod from being further rotated forward. When the pod 18 reaches its fully opened position, the upturn portion of the slot 202 will be located above the bolt 204, as seen in FIG. 19. The weight of the hold open plate 200 will cause the hold open plate to fall down such that the bolt 204 will enter the upturned portion of the slot, as seen in FIG. 19. When the bolt 204 is in the upturned portion of the slot 202 is generally referred to as the hold open or second position. In the hold open position, the pod 18 is selectively held in the opened position and cannot be rotated forward or rearward.

Because the weight of the pod will be resting on the hold open plate 200 and bolt 204, pulling the hold open plate up, out of the hold open position, would require someone to pull forward slightly on the pod 18 to relieve the pressure on the hold open plate and then someone else to pull the hold open plate up so that the pod can then be rotated backwards, towards its closed position. In order to allow the hold open plate 200 to be pulled up, e.g. moved from its hold open position to its rotate position, by a single person, the embodiment shown in FIGS. 19-23 includes a spring 206.

The spring 206 is attached at one end to the pod 18 as seen in FIG. 19. When it is desired to rotate the pod 18 away from its fully opened position, towards its closed position, the spring 206 can be attached at its second end to a notch 208 in the hold open plate 200 as seen in FIG. 19. The spring 206 pulls the hold open plate 200 upward, but because of the strength of the spring 206 and the weight of the pod 18 on the hold open plate 200 and bolt 204, the hold open plate is prevented from being pulled upward.

Figure 20:
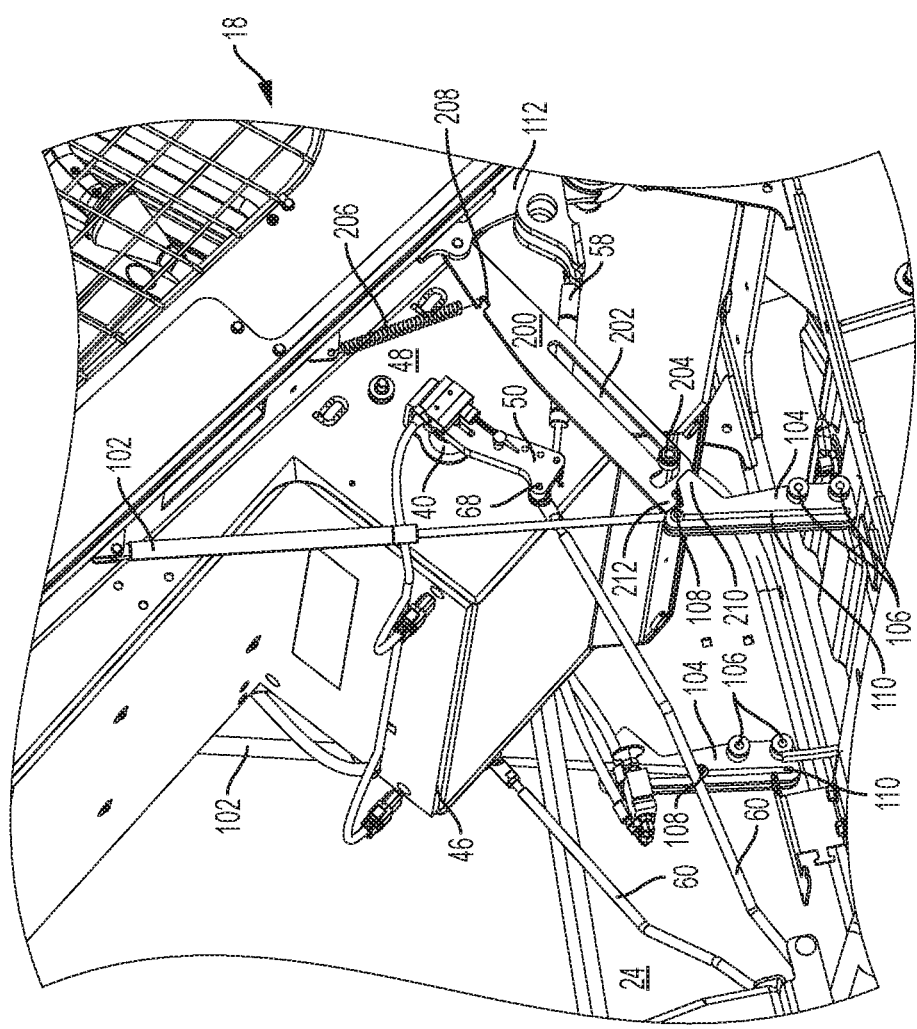
FIG. 20 is a perspective view of the hold open arm of FIG. 19 with a spring attached.

With the spring 206 attached to the notch 208 in the hold open plate 200, the pod 18 can be pulled forward or rocked to temporarily relieve the pressure between the bolt 204 and the hold open plate 200, such as by using the handle(s) 22. With the pressure relieved, the force of the spring 206 is sufficient to pull the hold open plate 200 up such that the bolt 204 will be at the corner of the upturned and elongated portions of the slot 202 as seen in FIG. 20. With the bolt 204 removed from the upturned portion of the slot 202 of the hold open plate 200, the pod 18 can be rotated rearwardly, towards its closed position.

Figure 21:
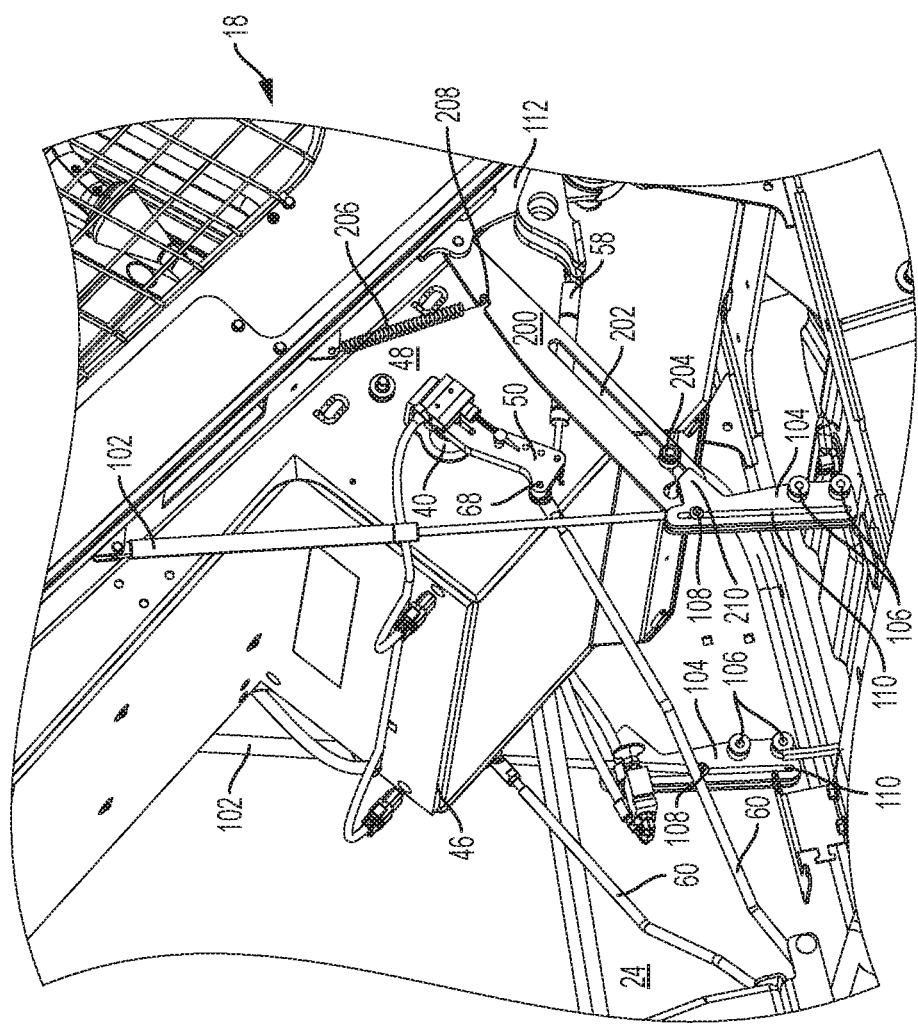
FIG. 21 is a perspective view of the hold open arm of FIG. 20 with the pod rotated slightly towards the closed position.
Figure 22:
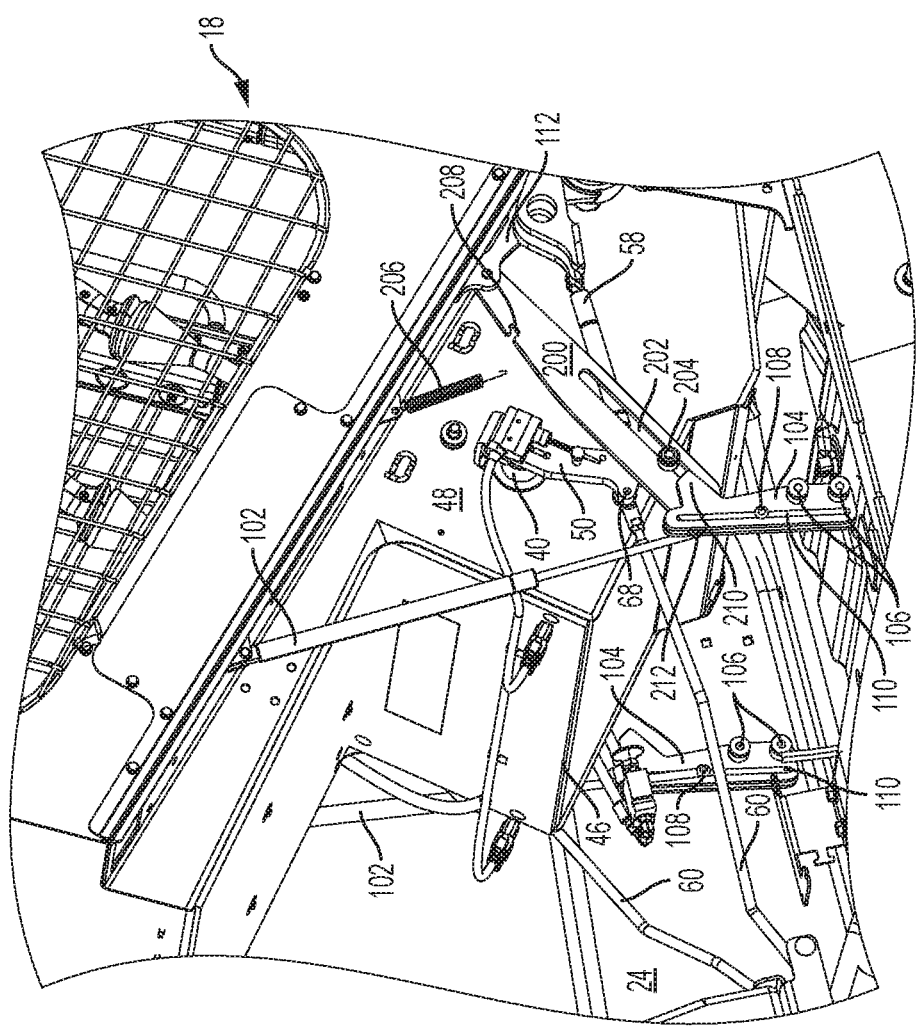
FIG. 22 is a perspective view of the hold open arm of FIG. 21 with the pod rotated slightly towards the closed position and the spring released from the hold open arm.
Figure 23:
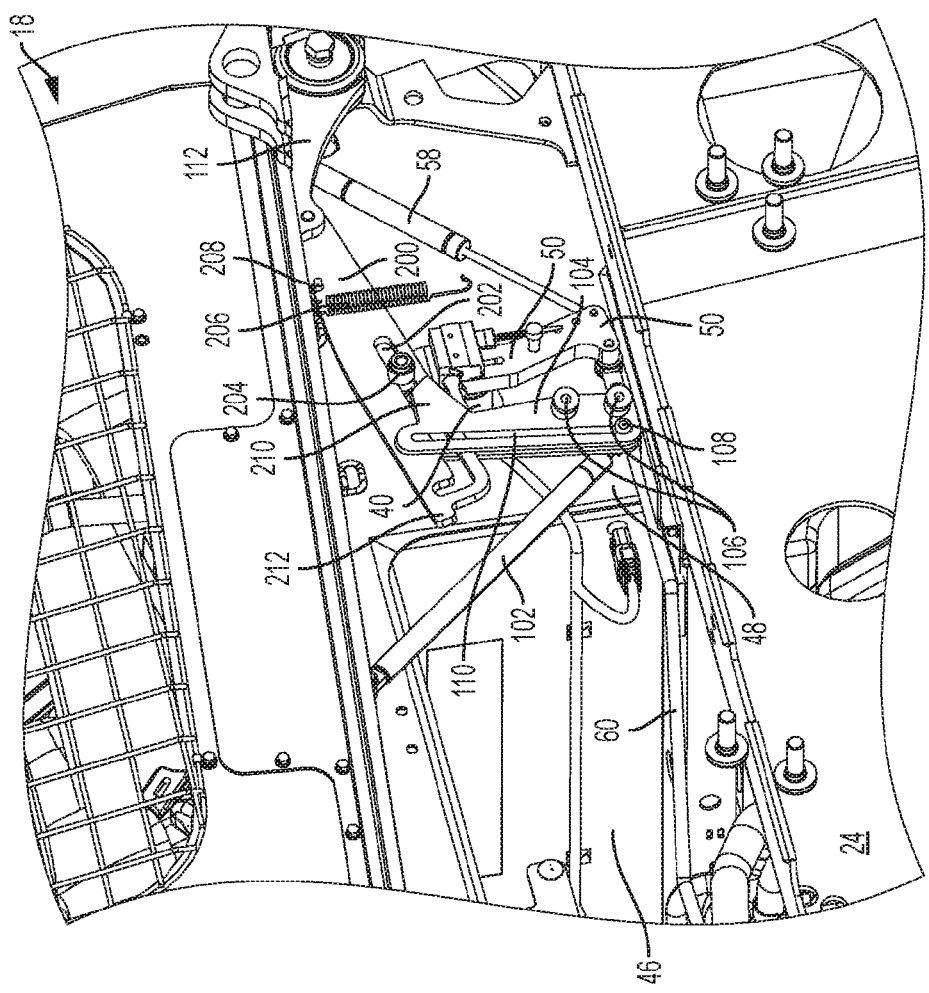
FIG. 23 is perspective view of the hold open arm of FIG. 22 with the pod in the fully closed position.

As the pod is further rotated rearwardly, the angle of the hold open plate 200 decreases, as does the notch 208, with respect to horizontal, which can been seen by comparing the hold open plate of FIGS. 21-23. When the pod is rotated far enough back and the hold open plate 200 angle changes such that the surface of the notch 208 that the hook of the spring 206 is contacting is angled upwardly, the force of the spring will cause the hook to pull out of the notch as seen in FIG. 22. With the hook of the spring 206 disengaged from the opening to the notch 208, the hold open plate 200 can once again move into its hold open position when the pod 18 is moved to its opened position.

As the pod 18 is rotated backwards, the gas springs 102 will once again cooperate with the pod, this time resisting much of the weight of the pod as it is rotated rearwardly. As the pod 18 is just starting to be rotated rearwardly, the left gas spring 102 will slide down the slot 110 of the left slide plate 104 until it reaches the bottom of the slot and begins to counteract some weight of the pod. As the pod 18 is further rotated rearwardly, the right gas spring 102 will slide down the slot 110 of the right slide plate 104 until it reaches the bottom of the slot and begins to also counteract some weight of the pod. Both gas springs 102 will then cooperate until the pod 18 is in its fully closed position and the pod generally horizontal as seen in FIG. 23.

In the embodiment shown in FIGS. 10, 12-16, the gas springs are sized and configured such that only a small amount of force or near zero net effort is required by a person to rotate the pod 18 forward. This size and configuration also allows the pod 18 to be slowly rotated rearwardly, in a controlled manner, with little effort from a person. However, the gas springs could be sized and configured in any number of orientations to achieve a desired result. For example, the gas springs could be sized and configured such that the pod 18 could be slowly rotated forward, in a controlled manner, with little effort from a person and require only a small amount of force by a person to rotate the pod rearwardly.

In the embodiment seen in FIGS. 11, 19-23, the free end of the hold open plate 200 is located between the forked portions of the 'U' shaped right slide plate 104. The right slide plate 104, the hold open plate 200, the bolt 204 and right gas spring 102 are configured such that the hold open plate is withdrawn past the slot 110 such that the bolt of the right gas spring is unabated from sliding all the way up the slot. When the pod 18 is in the fully opened position, the hold open plate 200 will remain just slightly between the forked portions of the 'U' shaped right slide plate 104, due to the projections 210 of the right slide plate. When the hold open plate 200 drops down into the hold open position, a tab 212 on the hold open plate remains between the projections 210 of the forked portion of the 'U' shaped right slide plate 104. The hold open plate 200 remaining between the forked portions of the 'U' shaped right slide plate 104 decreases the risk that components will get jammed or otherwise fail to perform as expected.

The hold open plate 200 could also be isolated from the frame 24. For example, the connection of the bolt 204 to the frame 24 could include a rubber bushing as could the connection of the hold open plate 200 to the pod 18.

Although the invention has been herein described in what is perceived to be the most practical and preferred embodiments, it is to be understood that the invention is not intended to be limited to the specific embodiments set forth above. For example, although the pod 18 is shown and described as rotating forward, the pod could be designed to rotate backwards without defeating the spirit of the invention. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A vehicle comprising:
   a frame;
   at least one ground engaging member connected to the frame such that the at least one ground engaging member can move the frame along a ground surface; and
   a cabin rotatably connected to the frame;
   a mechanically controlled pump operably connected to the at least one ground engaging member;
   at least one control lever attached to the cabin and capable of actuating the mechanically controlled pump;
   wherein the cabin may be rotated between a first position and a second position;
   wherein the control lever rotates with the cabin when the cabin is rotated between a first position and a second position; and
   wherein when the cabin is in the first position, the cabin is generally horizontal and when the cabin is in the second position, the cabin is not generally horizontal.

2. The vehicle of claim 1 wherein the manual controlled hydrostatic pump is located generally beneath the cabin and wherein when the cabin is in the second position, the manual controlled hydrostatic pump is accessible.

3. The vehicle of claim 1 further comprising a linkage rod operably connecting the at least one control lever to the manual controlled hydrostatic pump, wherein the at least one control lever actuates the manual controlled hydrostatic pump.

4. The vehicle of claim 3 wherein the at least one control lever can be adjusted from within the cabin.

5. The vehicle of claim 3 wherein the at least one control lever is connected to the linkage rod by a steering arm.

6. The vehicle of claim 5 wherein the linkage rod is connected to the manual controlled hydrostatic pump by a pintle arm.

7. The vehicle of claim 1 further comprising an isolating member located between the manual controlled hydrostatic pump and the cabin to reduce the transfer of noise and vibrations from the manual controlled hydrostatic pump to the cabin.

8. The vehicle of claim 1 wherein when the cabin is in the second position, the vehicle may be turned on.

9. A vehicle comprising:
   a body; and
   a pod pivotally attached to the body by a joint;
   a pump;
   an operator control positioned inside the pod and capable of actuating the pump via a mechanical connection;

the pod being movable between a closed position wherein an area beneath the pod is not accessible and an opened position wherein the area beneath the pod is accessible; and wherein when the pod is in the opened position, the operator control remains connected to the pump via the mechanical connection.

10. The vehicle of claim 9 wherein the pod is physically isolated from the body when the pod is in the closed position.

11. The vehicle of claim 9 further comprising:
a shoulder portion of the body for supporting the pod when the pod is in the closed position;
a first isolating member located between the pod and the body at the joint;
a second isolating member located between the operator control and the hydrostatic pump; and
a third isolating member between the pod and the shoulder portion.

12. The vehicle of claim 9 further comprising at least one lift support connected at one end to the pod and a second end to the body.

13. The vehicle of claim 12 wherein the at least one lift support is a first lift support connected at one end to a first side of the pod and a second end to a first side of the body and a second lift support connected at one end to a second side of the pod and a second end to a second side of the body.

14. The vehicle of claim 13 wherein the first lift support is attached to the pod at a first distance from a front of the pod and the second lift support is attached to the pod at a second distance from a front of the pod and the first distance is not the same as the second distance.

15. The vehicle of claim 12 wherein the at least one lift support is slidably connected to the body.

16. The vehicle of claim 9 further comprising a pod stand connected at one location to the pod and at a second location to the body.

17. The vehicle of claim 16 wherein the pod stand is slidably connected to the body.

18. The vehicle of claim 17:
wherein the pod stand is slidably connected to the body by a bolt attached to the body and slidably located in a slot of the pod stand; and
the pod stand being movable between a first position wherein the bolt is located in an elongated portion of the slot and the pod can be pivoted and a second position wherein the bolt is located in an upturned portion of the slot and the pod is selectively held in the opened position.

19. A loader vehicle comprising:
a frame;
at least one lift arm connected to the frame;
an implement connected to the at least one lift arm;
at least one ground engaging member connected to the frame;
a mechanically controlled pump operatively connected to one of the at least one lift arm, implement and at least one ground engaging member;
a cabin pivotally connected to the frame by a joint and movable between a closed position and an opened position;
a manual control lever located at least partially within the cabin;
a linkage rod connecting the manual control lever to the manual controlled pump such that the manual control lever can control a movable member of the loader vehicle, the movable member selected from a group consisting of the at least one lift arm, the implement and the at least one ground engaging member;
at least one spring connected at one end to the cabin and at a second end to the frame to assistant in moving the cabin between the closed position and the opened position; and
a hold open arm to selectively hold the cabin in the opened position;
wherein the joint is positioned proximate to a bottom and front portion of the cabin such that the cabin is rotated forward when the cabin is moved towards the opened position.

* * * * *